US011813793B2

(12) United States Patent
Budge et al.

(10) Patent No.: US 11,813,793 B2
(45) Date of Patent: Nov. 14, 2023

(54) PRINT HEAD FOR ADDITIVE MANUFACTURING SYSTEM

(71) Applicant: Continuous Composites Inc., Coeur d'Alene, ID (US)

(72) Inventors: Trevor David Budge, Coeur d'Alene, ID (US); Brock Adam Jahner, Coeur d'Alene, ID (US); Jeremiah R. Smith, Coeur d'Alene, ID (US); Nathan Andrew Stranberg, Post Falls, ID (US); Andrew Michael Stulc, Spokane, WA (US); Samuel VanDenBerg, Hayden, ID (US); Stephen Tyler Wilson, Coeur d'Alene, ID (US); Andrew John Overby, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 120 days.

(21) Appl. No.: 17/443,423

(22) Filed: Jul. 26, 2021

(65) Prior Publication Data
US 2022/0080658 A1 Mar. 17, 2022

Related U.S. Application Data

(60) Provisional application No. 62/706,825, filed on Sep. 11, 2020.

(51) Int. Cl.
*B29C 64/209* (2017.01)
*B29C 64/343* (2017.01)
(Continued)

(52) U.S. Cl.
CPC .......... *B29C 64/209* (2017.08); *B29C 64/106* (2017.08); *B29C 64/165* (2017.08);
(Continued)

(58) Field of Classification Search
CPC ... B29C 64/209; B29C 64/314; B29C 64/171; B29C 64/255; B29C 64/295;
(Continued)

(56) References Cited

U.S. PATENT DOCUMENTS

| 3,286,305 A | 11/1966 | Seckel |
| 3,809,514 A | 5/1974 | Nunez |

(Continued)

FOREIGN PATENT DOCUMENTS

| DE | 4102257 A1 | 7/1992 |
| EP | 2589481 B1 | 1/2016 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Joseph S Del Sole
*Assistant Examiner* — John Robitaille
(74) *Attorney, Agent, or Firm* — Ryan Stockett

(57) ABSTRACT

A system is disclosed for additively manufacturing a composite structure. The system may include a support, and a print head operatively connected to and moveable by the support. The print head may include a first supply configured to hold a continuous reinforcement, a second supply configured to hold a matrix separate from the continuous reinforcement, and a wetting mechanism in separate communication with the first and second supplies and configured to discharge the continuous reinforcement wetted with the matrix. The system may also include a controller programmed to selectively pressurize the second supply to direct the matrix to the wetting mechanism.

20 Claims, 20 Drawing Sheets

(51) Int. Cl.

| | |
|---|---|
| *B33Y 30/00* | (2015.01) |
| *B33Y 40/00* | (2020.01) |
| *B29C 64/255* | (2017.01) |
| *B29C 64/393* | (2017.01) |
| *B33Y 50/02* | (2015.01) |
| *B33Y 10/00* | (2015.01) |
| *B29C 64/165* | (2017.01) |
| *B29C 64/241* | (2017.01) |
| *B29C 64/171* | (2017.01) |
| *B29C 64/106* | (2017.01) |
| *B29C 64/314* | (2017.01) |
| *B29C 64/295* | (2017.01) |
| *B33Y 40/10* | (2020.01) |
| *B29K 105/08* | (2006.01) |

(52) U.S. Cl.
CPC .......... *B29C 64/171* (2017.08); *B29C 64/241* (2017.08); *B29C 64/255* (2017.08); *B29C 64/295* (2017.08); *B29C 64/314* (2017.08); *B29C 64/343* (2017.08); *B29C 64/393* (2017.08); *B33Y 10/00* (2014.12); *B33Y 30/00* (2014.12); *B33Y 40/00* (2014.12); *B33Y 40/10* (2020.01); *B33Y 50/02* (2014.12); *B29C 2948/92904* (2019.02); *B29K 2105/08* (2013.01)

(58) Field of Classification Search
CPC ... B29C 64/343; B29C 64/393; B29C 64/241; B29C 64/106; B29C 64/165; B33Y 10/00; B33Y 30/00; B33Y 40/00; B33Y 50/02; B33Y 40/10
See application file for complete search history.

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,238,613 B1 * | 5/2001 | Batchelder | B29C 48/09 137/13 |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,511,543 B2 | 12/2016 | Tyler | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,315,355 B2 | 6/2019 | Tyler | |
| 10,315,356 B2 | 6/2019 | Tyler | |
| 10,449,711 B2 | 10/2019 | Tyler | |
| 10,603,836 B2 | 3/2020 | Tyler | |
| 10,744,707 B2 | 8/2020 | Tyler | |
| 10,744,708 B2 | 8/2020 | Tyler | |
| 10,759,109 B2 | 9/2020 | Tyler | |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0076371 A1 * | 4/2003 | Fong | B29C 64/40 347/1 |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0136897 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |

(56) References Cited

U.S. PATENT DOCUMENTS

| | | |
|---|---|---|
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2019/0022935 A1 | 1/2019 | Tooren et al. |
| 2019/0315057 A1 | 10/2019 | Budge et al. |
| 2020/0156318 A1 | 5/2020 | Stranberg et al. |
| 2020/0324468 A1 | 10/2020 | Tyler |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).
C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).
Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.
Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).
M. Martin-Gallego et al., Epoxy-Graphene UV-Cured Nanocomposites, Polymer, vol. 52, Issue 21, pp. 4664-4669 (Sep. 2011).
P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).
S Kumar & J.-P. Kruth, Composites by Rapid Prototyping Technology, Materials and Design, (Feb. 2009).
S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).
T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.
Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

(56) References Cited

OTHER PUBLICATIONS

International Search Report dated Sep. 11, 2021 for PCT/US2021/070977 to Continuous Composites Inc. filed on Jul. 27, 2021.

* cited by examiner

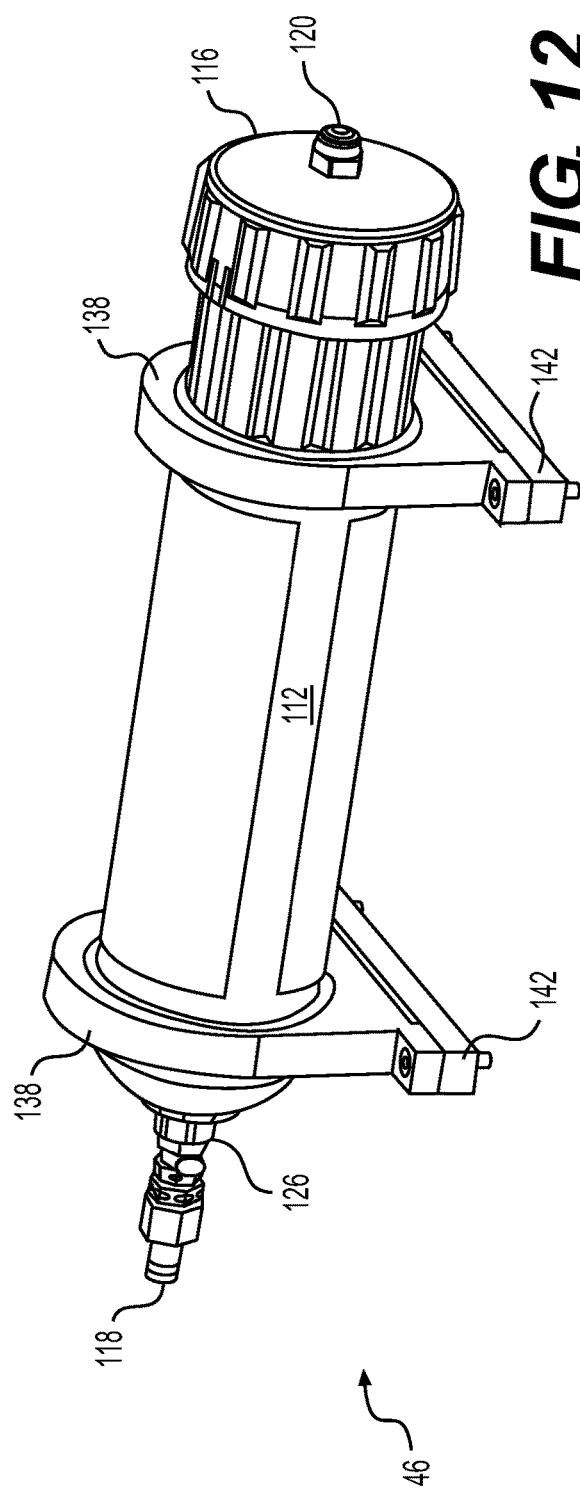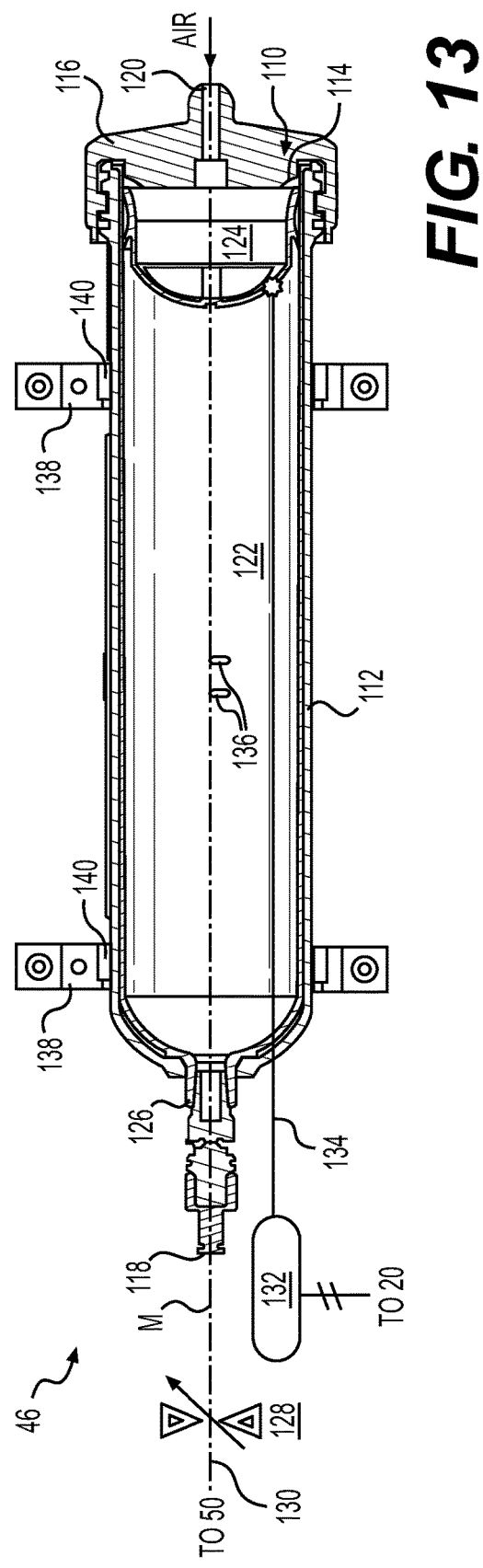

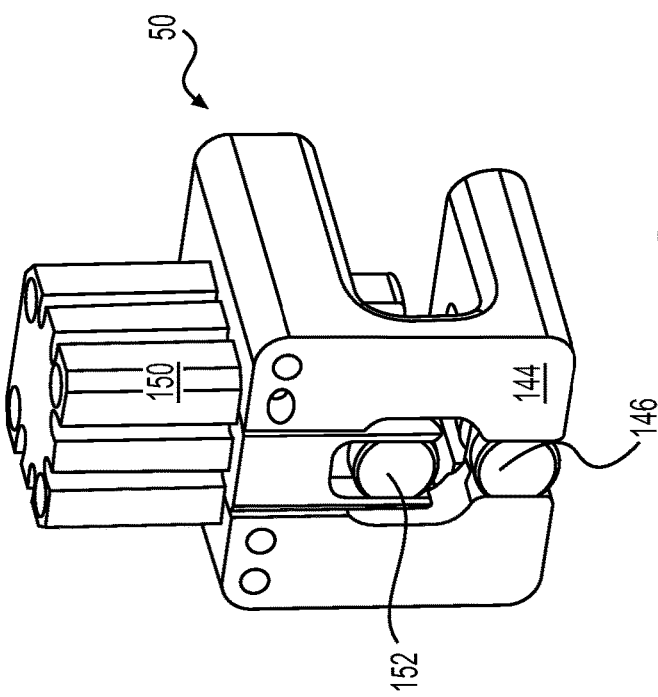
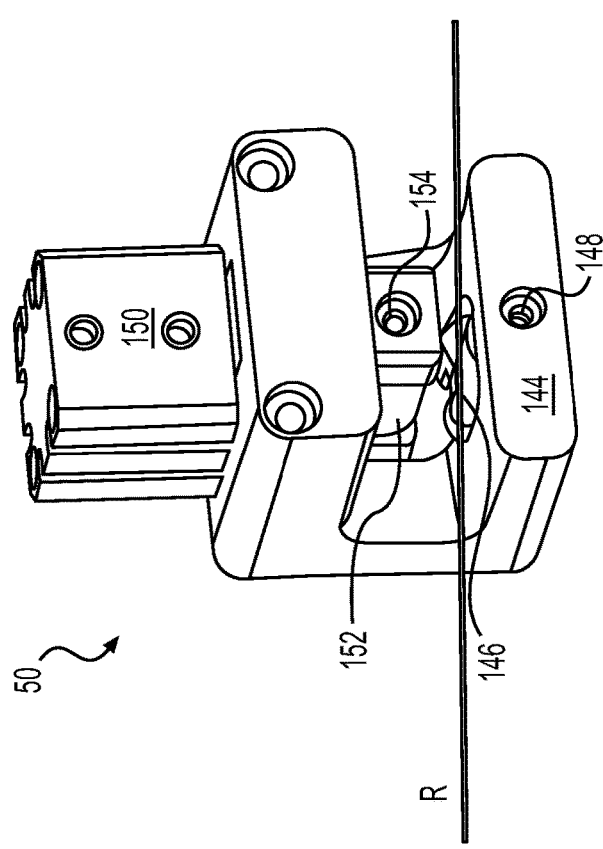
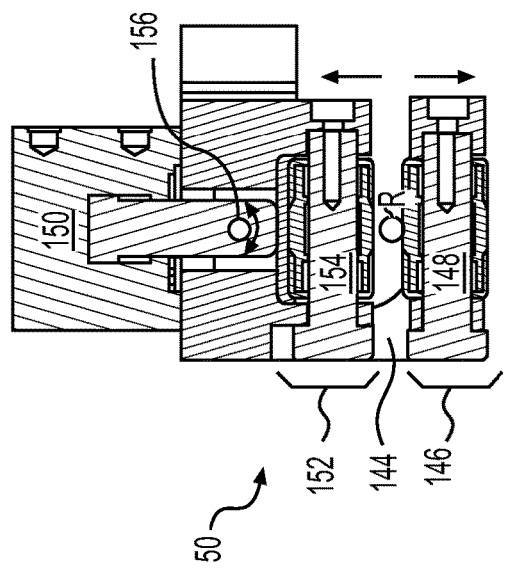

US 11,813,793 B2

PRINT HEAD FOR ADDITIVE MANUFACTURING SYSTEM

RELATED APPLICATION

This application is based on and claims the benefit of priority from U.S. Provisional Application No. 62/706,825 that was filed on Sep. 11, 2020, the contents of which are expressly incorporated herein by reference.

TECHNICAL FIELD

The present disclosure relates generally to a manufacturing system and, more particularly, to a print head for an additive manufacturing system.

BACKGROUND

Continuous fiber 3D printing (a.k.a., CF3D®) involves the use of continuous fibers embedded within material discharging from a moveable print head. A matrix is supplied to the print head and discharged (e.g., extruded and/or pultruded) along with one or more continuous fibers also passing through the same head at the same time. The matrix can be a traditional thermoplastic, a liquid thermoset (e.g., an energy-curable single- or multi-part resin), or a combination of any of these and other known matrixes. Upon exiting the print head, a cure enhancer (e.g., a UV light, a laser, an ultrasonic emitter, a heat source, a catalyst supply, etc.) is activated to initiate, enhance, and/or complete curing of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to TYLER on Dec. 6, 2016.

Although continuous fiber 3D printing provides for increased strength, compared to manufacturing processes that do not utilize continuous fiber reinforcement, care must be taken to ensure proper wetting of the fibers with the matrix, proper cutting of the fibers, automated restarting after cutting, proper compaction of the matrix-coated fibers after discharge, and proper curing of the compacted material. An exemplary print head that provides for at least some of these functions is disclosed in U.S. Patent Application Publication 2019/0315057 that published on Oct. 17, 2019 ("the '057 publication").

While the print head of the '057 publication may be functionally adequate for many applications, it may be less than optimal. For example, the print head may lack accuracy in placement, cutting, compaction, and/or curing that is required for other applications. The disclosed print head and system are directed at addressing one or more of these issues and/or other problems of the prior art.

SUMMARY

In one aspect, the present disclosure is directed to a system for additively manufacturing a composite structure. The system may include a support and a print head operatively connected to and moveable by the support. The print head may include a first supply configured to hold a continuous reinforcement, a second supply configured to hold a matrix separate from the continuous reinforcement, and a wetting mechanism in separate communication with the first and second supplies and configured to discharge the continuous reinforcement wetted with the matrix. The system may also include a controller programmed to selectively pressurize the second supply to direct the matrix to the wetting mechanism.

In another aspect, the present disclosure is directed to a method of additively manufacturing a composite structure. The method may include directing a continuous reinforcement from a first supply on a print head to a wetting mechanism, and selectively pressurizing a second supply on the print head to push a liquid matrix from the second supply to the wetting mechanism. The method may also include wetting the continuous reinforcement with the liquid matrix in the wetting mechanism, and discharging the wetted continuous reinforcement through an outlet of the print head.

BRIEF DESCRIPTION OF THE DRAWINGS

FIGS. 12 and 13 are diagrammatic and cross-sectional illustrations, respectively, of an exemplary disclosed matrix supply portion of the print head of FIGS. 2 and 3;

FIGS. 14 and 15 are diagrammatic illustrations and FIG. 16 is a cross-sectional illustration of an exemplary disclosed clamping portion of the print head of FIGS. 2 and 3;

DETAILED DESCRIPTION

The term "about" as used herein serves to reasonably encompass or describe minor variations in numerical values measured by instrumental analysis or as a result of sample handling. Such minor variations may be in the order of plus or minus 0% to 10%, plus or minus 0% to 5%, or plus or minus 0% to 1%, of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Figure 1:
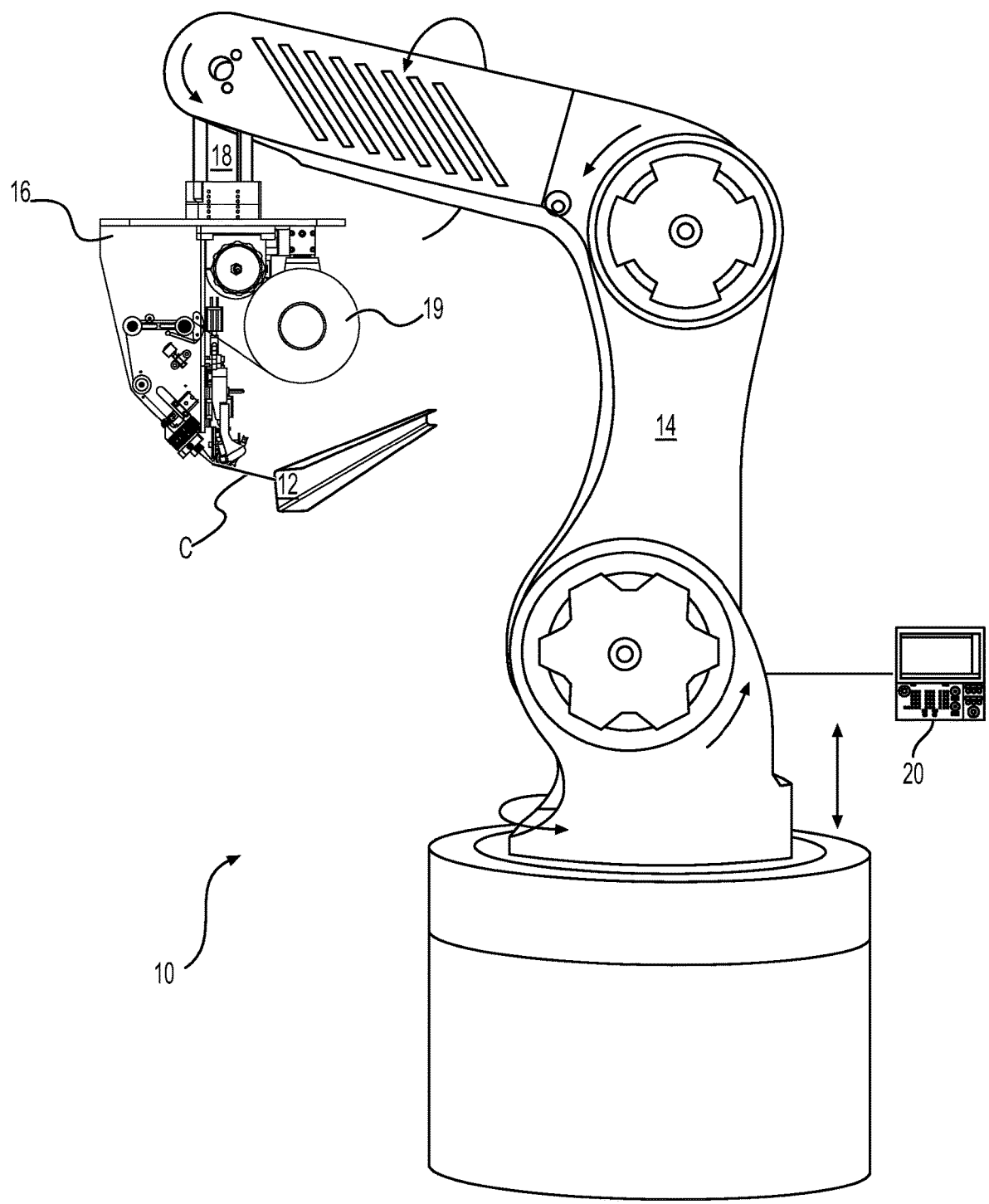
FIG. 1 is a diagrammatic illustration of an exemplary disclosed additive manufacturing system.

FIG. 1 illustrates an exemplary system 10, which may be used to manufacture a composite structure 12 having any desired shape, size, configuration, and/or material composition. System 10 may include at least a support 14 and a head 16. Head 16 may be coupled to and moveable by support 14 during discharge of a composite material (shown as C). In the disclosed embodiment of FIG. 1, support 14 is a robotic arm capable of moving head 16 in multiple directions during fabrication of structure 12. Support 14 may alternatively embody a gantry (e.g., an overhead-bridge gantry, a single-post gantry, etc.) or a hybrid gantry/arm also capable of moving head 16 in multiple directions during fabrication of structure 12. Although support 14 is shown as being capable of 6-axis movements, it is contemplated that any other type of support 14 capable of moving head 16 in the same or a different manner could also be utilized. In some embodiments, a drive or coupler 18 may mechanically join head 16 to support 14, and include components that cooperate to move portions of and/or supply power and/or materials to head 16.

Head 16 may be configured to receive or otherwise contain a matrix that, together with a continuous reinforcement, makes up the composite material discharging from head 16. The matrix may include any type of material that is curable (e.g., a liquid resin, such as a zero-volatile organic compound resin, a powdered metal, etc.). Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., by an extruder or another type of pump—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16 and pushed or pulled out of head 16 along with one or more continuous reinforcements. In some instances, the matrix inside head 16 may benefit from being kept cool and/or dark (e.g., to inhibit premature curing or otherwise obtain a desired rate of curing after discharge). In other instances, the matrix may need to be kept warm for similar reasons. In either situation, head 16 may be specially configured (e.g., insulated, temperature-controlled, shielded, etc.) to provide for these needs.

The matrix may be used to coat any number of continuous reinforcements (e.g., separate fibers, tows, rovings, ribbons, socks, sheets and/or tapes of continuous material) and, together with the reinforcements, make up a portion (e.g., a wall) of composite structure 12. The reinforcements may be stored within (e.g., on one or more separate internal creels 19) or otherwise passed through head 16 (e.g., fed from one or more external spools—not shown). When multiple reinforcements are simultaneously used (e.g., interwoven, one on top of another, adjacent tracks, etc. that are combined prior to and/or after entering head 16), the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that are at least partially encased in the matrix discharging from head 16.

The reinforcements may be exposed to (e.g., at least partially coated with) the matrix while the reinforcements are inside head 16, while the reinforcements are being passed to head 16, and/or while the reinforcements are discharging from head 16. The matrix, dry reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers) may be mixed with the matrix before and/or after the matrix coats the continuous reinforcements.

As will be explained in more detail below, one or more cure enhancers (e.g., a UV light, an ultrasonic emitter, a laser, a heater, a catalyst dispenser, etc.) may be mounted proximate (e.g., within, on, or adjacent) head 16 and configured to enhance a cure rate and/or quality of the matrix as it discharges from head 16. The cure enhancer(s) may be controlled to selectively expose portions of structure 12 to energy (e.g., to UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, or otherwise cause the matrix to cure as it discharges from head 16. The amount of energy produced by the cure enhancer(s) may be sufficient to cure the matrix before structure 12 axially grows more than a predetermined length away from head 16. In one embodiment, structure 12 is cured before the axial growth length becomes equal to an external diameter of the matrix-coated reinforcement.

The matrix and/or reinforcement may be discharged from head 16 via one or more different modes of operation. In a first exemplary mode of operation, the matrix and/or reinforcement are extruded (e.g., pushed under pressure and/or mechanical force) from head 16 as head 16 is moved by support 14 to create the 3-dimensional trajectory within a longitudinal axis of the discharging material. In a second exemplary mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, etc.), while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor (e.g., a print bed, a table, a floor, a wall, a surface of structure 12, etc.—not shown). In particular, at the start of structure formation, a length of matrix-impregnated reinforcement may be pulled and/or pushed from head 16, deposited onto the anchor, and at least partially cured, such that the discharged material adheres (or is otherwise coupled) to the anchor. Thereafter, head 16 may be moved away from the anchor (e.g., via controlled regulation of support 14), and the relative movement may cause the reinforcement to be pulled from head 16. It should be noted that the movement of reinforcement through head 16 could be assisted (e.g., via one or more internal feed mechanisms), if desired. However, the discharge rate of reinforcement from head 16 may primarily be the result of relative movement between head 16 and the anchor, such that tension is created within the reinforcement. It is contemplated that the anchor could be moved away from head 16 instead of or in addition to head 16 being moved away from the anchor.

A controller 20 may be provided and communicatively coupled with support 14, head 16, and any number of the cure enhancer(s). Each controller 20 may embody a single processor or multiple processors that are specially programmed or otherwise configured to control an operation of system 10. Controller 20 may further include or be associated with a memory for storing data such as, for example, design limits, performance characteristics, operational instructions, tool paths, and corresponding parameters of each component of system 10. Various other known circuits may be associated with controller 20, including power supply circuitry, signal-conditioning circuitry, solenoid driver circuitry, communication circuitry, and other appropriate circuitry. Moreover, controller 20 may be capable of communicating with other components of system 10 via wired and/or wireless transmission.

One or more maps may be stored in the memory of controller 20 and used by controller 20 during fabrication of structure 12. Each of these maps may include a collection of data in the form of lookup tables, graphs, and/or equations. In the disclosed embodiment, controller 20 may be specially programmed to reference the maps and determine movements of head 16 required to produce the desired size, shape, and/or contour of structure 12, and to responsively coordinate operation of support 14, the cure enhancer(s), and other components of head 16.

Figure 2:
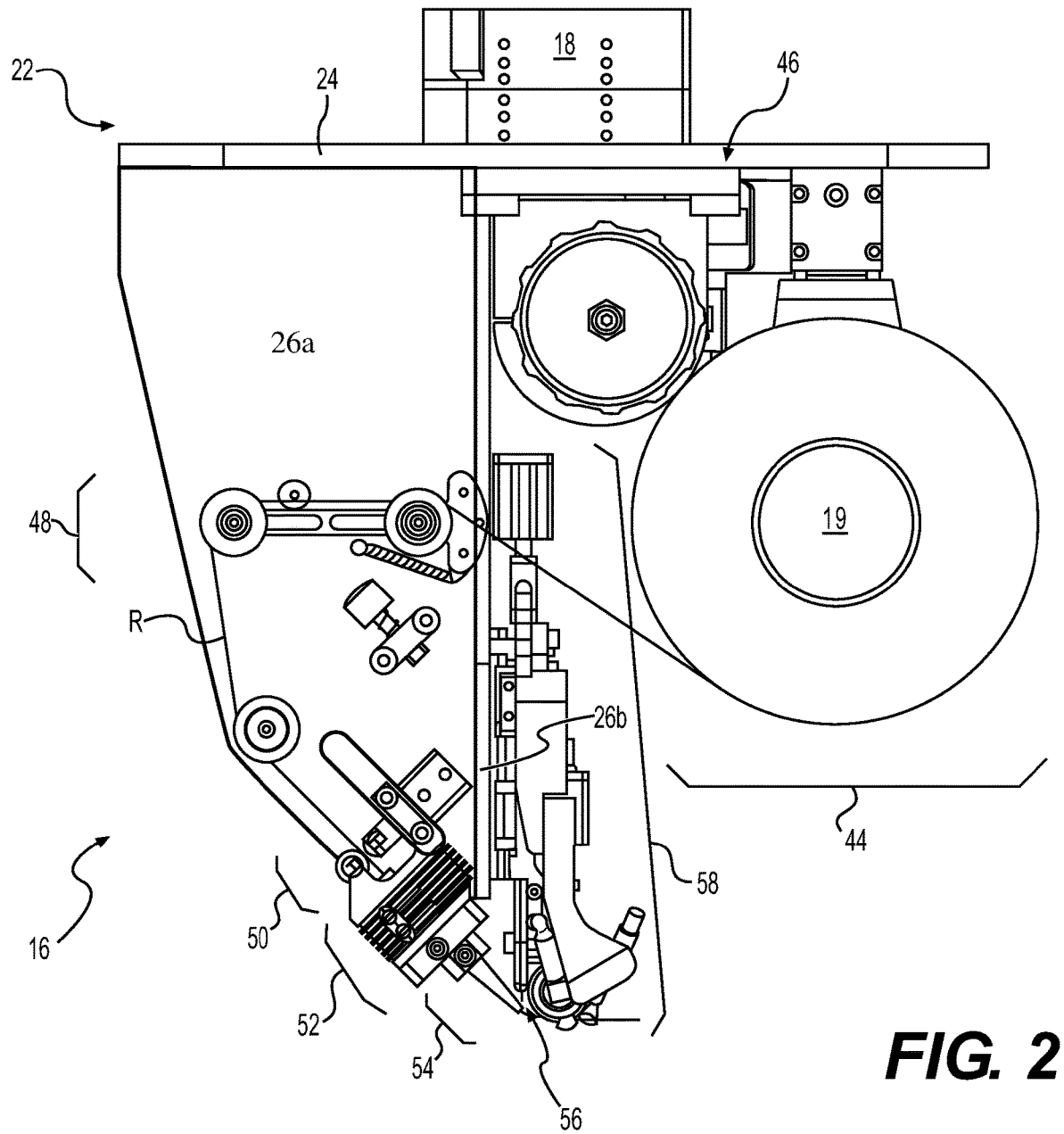
FIGS. 2 and 3 are diagrammatic illustrations of an exemplary disclosed print head that may form a portion of the additive manufacturing system of FIG. 1.
Figure 3:
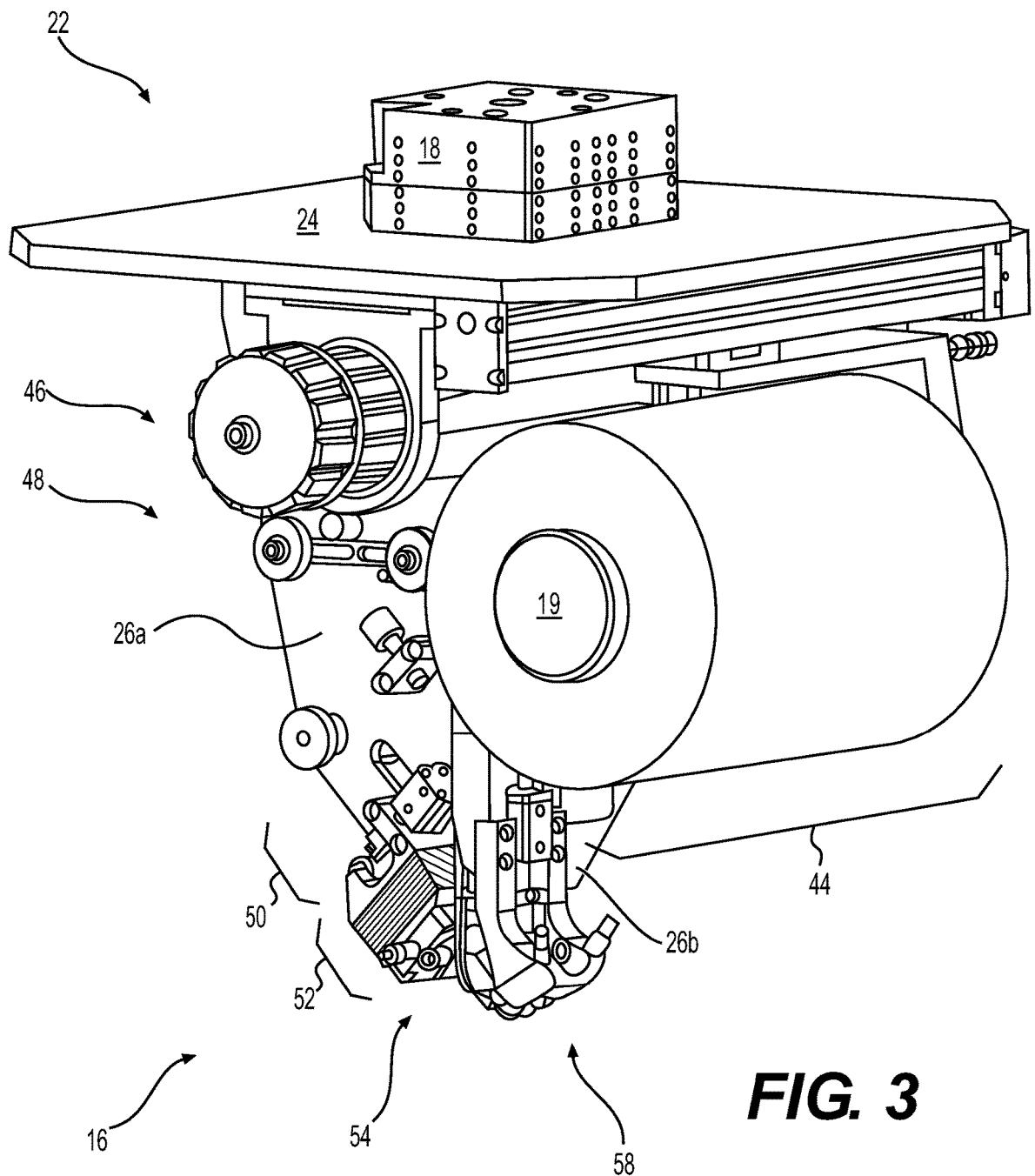

An exemplary head 16 is disclosed in greater detail in FIGS. 2 and 3. As can be seen in these figures, head 16 may include a housing 22 that is configured to hold, enclose, contain, and/or provide mounting for the remaining components of head 16. Housing 22 may include any number of panels connected to each other to form a multi-sided enclosure that supports and protects the other components. In the disclosed embodiment, the enclosure of housing 22 is generally T-shaped, having an upper generally horizontal plate 24 (e.g., as viewed from the perspective of FIG. 2) and one or more lower plates 26 (e.g., a primary plate 26*a* and an orthogonally oriented gusset 26*b*) that are generally vertical and intersect with upper plate 24. The other components of head 16 may be mounted to a front and/or back of lower plate(s) 26, and to an under side of upper plate 24. As will be explained in more detail below, some components may extend downward past a terminal end of lower plate(s) 26. Likewise, some components may extend transversely from lower plate(s) 26 past outer edges of upper plate 24.

Upper plate 24 may be generally square, while lower plate 26 may be elongated. Lower plate 26 may have a wider proximal end rigidly connected to a general center of upper plate 24 and a narrower distal end that is cantilevered from the proximal end. Coupler 18 may be connected to upper plate 24 at a side opposite lower plate(s) 26 and used to quickly and releasably connect head 16 to support 14. One or more racking mechanisms (e.g., handles, hooks, eyes, etc.—not shown) may be located adjacent coupler 18 and used to rack head 16 (e.g., during tool changing) when head 16 is not connected to support 14.

As shown in FIGS. 2 and 3, any number of components of head 16 may be mounted to housing 22 via upper and/or lower plates 24, 26. For example, a reinforcement supply module 44 and a matrix supply module 46 may be operatively connected to upper plate 24, while a tensioning module 48, a clamping module 50, a wetting module 52, an outlet 54, a cutting module 56, and a compacting/curing module 58 may be operatively mounted to lower plate(s) 26. It should be noted that other mounting arrangements may also be possible. Any number of conduits, valves, actuators, chillers, heaters, manifolds, wiring harnesses, and other similar components may be co-mounted to one or more of upper and/or lower plates 24, 26, if desired.

As will be described in more detail below, the reinforcement may pay out from module 44, pass through and be tension-regulated by module 48, be wetted with matrix in module 52 (e.g., as supplied by module 46) and be discharged through outlet 54. After discharge, the matrix-wetted reinforcement may be selectively severed via module 56 (e.g., while being held stationary by module 50) and thereafter compacted and/or cured by module 58.

Figure 4:
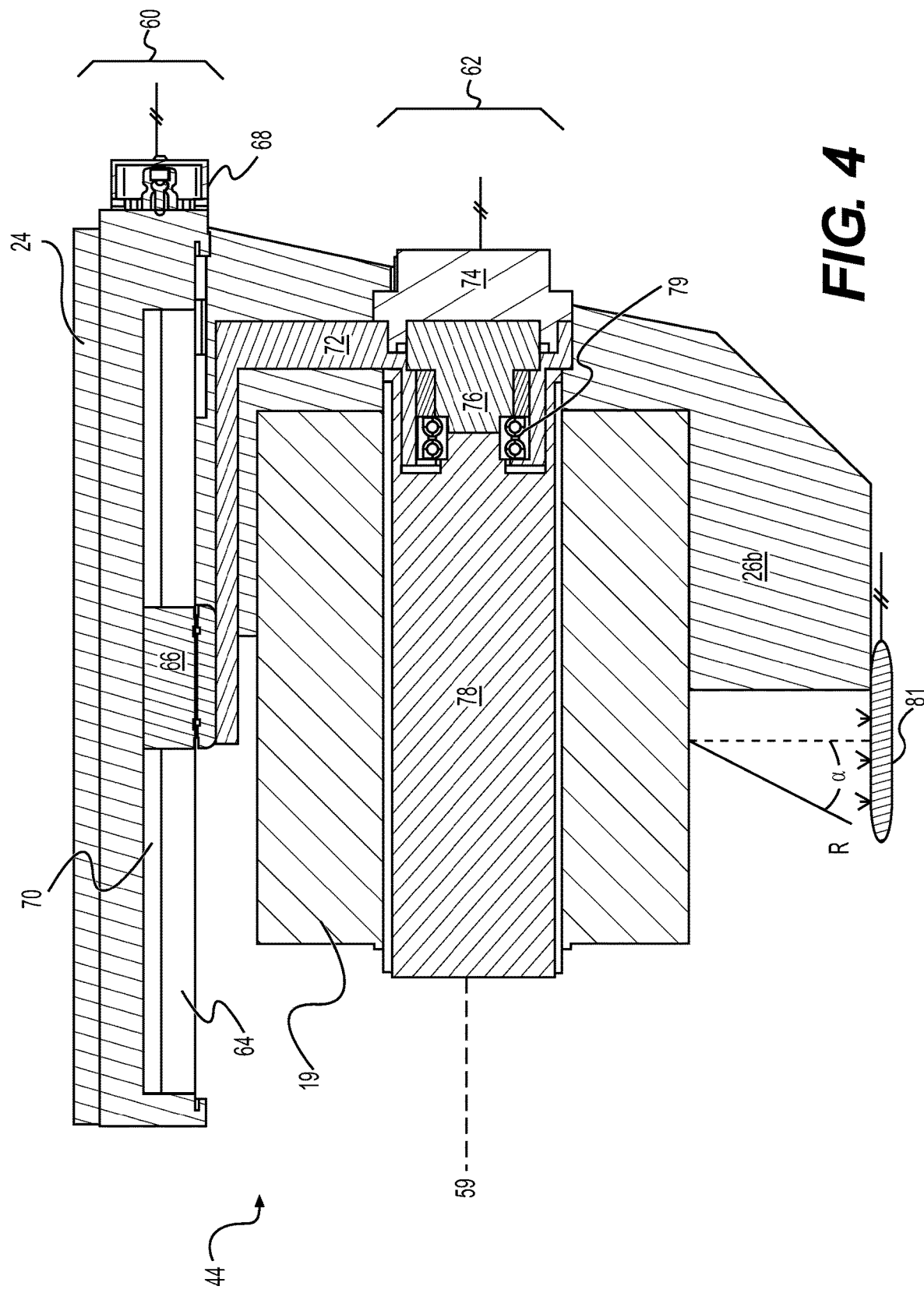
FIG. 4 is a cross-sectional illustration of an exemplary disclosed reinforcement supply portion of the print head of FIGS. 2 and 3.

As shown in FIG. 4, module 44 may be a subassembly that includes components configured to selectively allow and/or drive rotation of creel 19, while simultaneously translating creel 19 in an axial direction during the rotation. As will be discussed in more detail below, the rotation of creel 19 may be regulated by controller 20 (referring to FIG. 1) based, at least in part, on a detected position and/or status of module 48. This responsive rotational regulation may help to maintain one or more desired levels of tension within the reinforcement (e.g., a nominal tension during normal discharge; a lower level during free-space printing; a higher level during severing, etc.). The axial translation of creel 19 may help the reinforcement to feed substantially perpendicularly from creel 19 (e.g., relative to an axis 59 of creel 19), regardless of an axial location at which the reinforcement is being fed from creel 19. That is, the reinforcement may initially be loaded onto creel 19 in a spiraling motion and, unless otherwise accounted for, the feed location of the reinforcement from creel 19 may shift axially from one end of creel 19 to an opposing end during unspooling. This axial shifting of the feed point could cause degradation to the reinforcement and/or interrupt smooth operation of downstream components (e.g., of module 48 that is located immediately downstream). Accordingly, by translating creel 19 along axis 59 (e.g., at a rate corresponding to the spiral of the reinforcement on creel 19) during unspooling, the reinforcement may be maintained at a relatively constant feed location and angle α relative to the rest of head 16. This may reduce degradation of the reinforcement and help ensure smooth feeding into and operation of module 48. In some embodiments, the constant feed location and/or angle α may additionally or alternatively inhibit untwisting of the reinforcement during unspooling.

The subassembly components of module 44 may include, among other things, a translating actuator 60 rigidly connected to at least one of upper and lower plates 24, 26 (e.g., to only upper plate 24), and a rotating actuator 62 operatively connecting creel 19 to translating actuator 60. During operation, controller 20 may selectively activate translating actuator 60 and cause rotating actuator 62 and creel 19 to reciprocate together in a direction generally orthogonal to primary plate 26*a* (referring to FIGS. 2 and 3). Controller 20 may coordinate this reciprocation in coordination with rotation of actuator 62 and unspooling of creel 19. It should be noted that the unspooling of creel 19 may be based primarily on the tension requirements of module 48, and that the reciprocation is controlled in response to the unspooling.

In one example, translating actuator 60 may include a rail 64, a carriage 66 configured to slide along rail 64, and a motor 68 configured to cause the sliding of carriage 66. Motor 68 may embody an electric, hydraulic, pneumatic, or other type of motor connected to carriage 66 (e.g., by way of a lead screw 70). It is contemplated that another type of translating actuator (e.g., a cylinder) could be used, if desired.

In one example, rotating actuator 62 may be rigidly connected to carriage 66 of translating actuator 60 via an arm 72. A rotary actuator 74 may be fixedly connected to arm 72, and include a rotor 76 rotationally affixed to creel 19 (e.g., to a spool core 78). In one example, spool core 78 may be easily removed (e.g., slipped off axially) from rotor 76 and rotationally locked to rotor 76 (e.g., via a keyway, a friction device, etc.). Rotor 76 may be rotationally supported by arm 72 via one or more bearings 79.

The coordination by controller 20 of the rotation and translation of creel 19 may be performed multiple different ways. In one example, an initial spiral rate of the reinforcement on the spool may be assumed or provided by the reinforcement manufacturer, and controller 20 may generate a feedforward command based on the assumption to translate and rotate creel at corresponding rates. In some embodiments, a decreasing diameter of creel 19 (e.g., due to consumption of the reinforcement) may affect the assumed or provided rate of spiral. Accordingly, the diameter may also be assumed (e.g., based on known and/or commanded motions, consumption, and/or payout from head 16), measured (e.g., via a diameter sensor—not shown), and/or back calculated based on reinforcement payout and/or head velocity and accounted for by controller 20.

In another example, the angle α of the reinforcement paying out from the spool of creel 19 may be directly measured. In this example, controller 20 may generate a feedback signal that adjusts the rotation and/or translation rate and/or position, such that the angle of the reinforcement is maintained within a threshold (e.g., α≈15°) of 90° relative to the axis of creel 19. Any number of angle and/or position (e.g., optical, mechanical, etc.) sensors 81 may be employed for this purpose and connected to controller 20. It is contemplated that both the feedforward and feedback signals may be utilized by controller 20 to regulate the rotation and/or translation of creel 19, if desired. It is also contemplated that the rotation may be regulated solely based on the tension with the reinforcement and only the translation may be adjusted based on the payout angle of the reinforcement.

In some applications, it may not be possible or feasible to completely eliminate angle α during unspooling of creel 19. In these applications, one or more centering guides 80 may be placed between modules 46 and 48 (e.g., alone or in series) that further reduce angle α. Exemplary guides 80 are illustrated in FIGS. 5-8.

Figure 5:
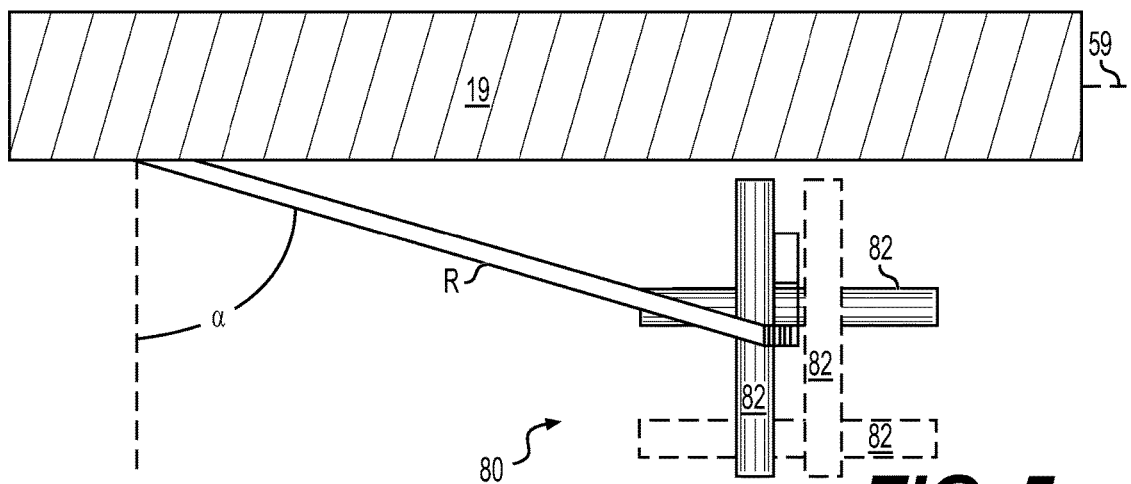
FIGS. 5-8 are diagrammatic illustrations of exemplary disclosed guide portions of the print head of FIGS. 2 and 3.

The example guide 80 of FIG. 5 may include any number of rotary redirects 82 arranged into any number of pairs that are substantially orthogonal to each other. For example, a first pair (one shown in phantom) of redirects 82 may be oriented parallel to each other and generally orthogonal to axis 59, and a second pair (one shown in phantom) of redirects 82 may be oriented parallel to each other and parallel to axis 59. Two sets of orthogonal redirects 82 may function to capture the reinforcement therebetween, eliminating a risk of losing control over reinforcement placement. However, it is contemplated that, alternatively, one pair of parallel redirects 82 (e.g., the pair that is orthogonal to axis 59) and a single additional redirect 82 (e.g., a redirect that is parallel to axis 59) could be utilized, wherein the single additional redirect 82 is located at an extreme or maximum position within an expected range of reinforcement motion (i.e., such that the reinforcement always wraps at least partially around the single additional redirect 82, regardless of feed location from the spool of creel 19). It is also contemplated that only two orthogonal redirects 82 (i.e., no parallel pairs) could alternatively be utilized (i.e., such that the reinforcement always wraps at least partially around each of the redirects), if desired.

In one embodiment, the redirect(s) 82 parallel to axis 59 may be out-of-plane from the redirect(s) 82 that are perpendicular to axis 59. This may allow the reinforcement to twist (e.g., by about 90°) between the redirects 82. That is, the reinforcement may have a generally rectangular cross-section, with a width greater than a height. With the out-of-plane configuration, the redirect(s) 82 may always engage the width of the reinforcement, thereby exerting a lower pressure on the reinforcement and reducing a likelihood of the reinforcement crumpling or folding. When passing from module 46 to module 48, this may require the reinforcement to twist +90° to properly engage the upstream redirect(s) 82, and twist back −90° to properly engage the downstream redirect(s) 82. A spacing between planes of the upstream and downstream redirects may be large enough to accommodate a single 90° twist therebetween. In one embodiment, the axial distance between the upstream and downstream redirects may be at least equal to two times the width of the reinforcement. Once the reinforcement is threaded between the upstream and downstream redirects 82, a tension placed on the reinforcement by module 48 may help maintain the desired engagement of the reinforcements with the upstream and downstream redirects 82.

Because redirects 82 may act on the reinforcement while the reinforcement is dry (e.g., before being wetted with matrix by module 52), a diameter of each redirect may be small because the individual filaments of the reinforcement may move more easily relative to each other as the reinforcement bends around the redirects 82. Each redirect may be fabricated from a smooth and/or low-surface energy material. This material may include, for example, a polished steel or a plastic (e.g., UHMW, PTFE, FEP, an acetal homopolymer such as Polyoxymethylene, a fluoropolymer, a coated metal, etc.).

Figure 6:
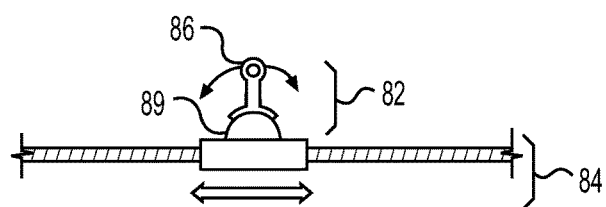
Figure 7:
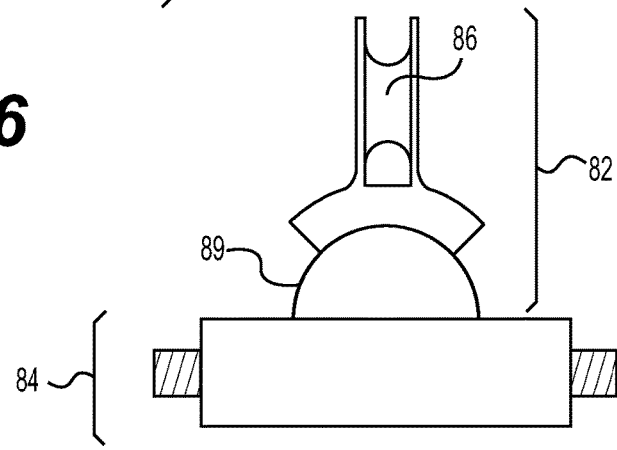

In an alternative configuration shown in FIG. 6, guide 80 may be configured to translate with or in place of translation of creel 19. For example, guide 80 may include a redirect 82 connected to a linear actuator 84 (e.g., a carriage/lead screw/motor configuration). In this configuration, guide 80 may move axially with the unspooling reinforcement, such that the angle α is reduced or reduced further than translation of creel 19 alone. It is contemplated that, when both guide 80 and creel 19 translate, the translation of creel 19 may be greater than the translation of guide 80.

In one example, in addition or as an alternative to translating, redirect 82 may tilt or pivot relative to linear actuator 84. For example, redirect 82 may be elongated, having an eyelet (shown in FIG. 6) or other guide feature (e.g., roller—see FIG. 7) 86 for receiving the reinforcement at a distal end and being pivotally connected to linear actuator 84 at an opposing end. Redirect 82 may be biased (e.g., via a torsional spring 89) to a center or perpendicular position (e.g., where α is minimized). During operation, as the reinforcement unspools from creel 19 and nears the extreme ends of the associated spool, an increasing tension in the reinforcement may cause pivoting of redirect 82 toward the respective end. This may limit the amount of tension allowed to pass through the reinforcement, thereby reducing damage to the reinforcement.

Figure 8:
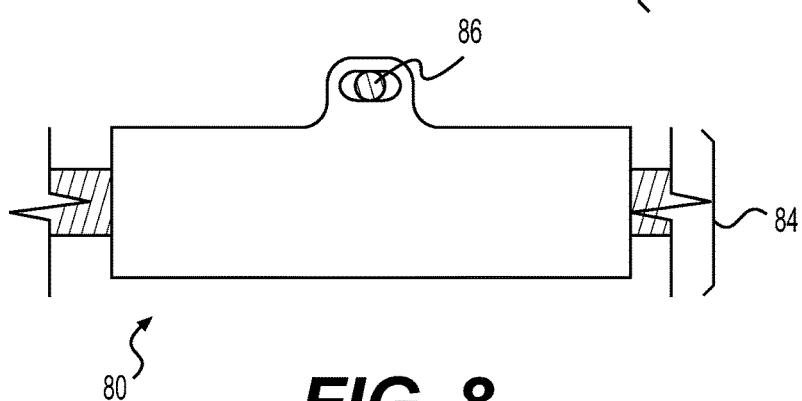

In an alternative embodiment, redirect 82 may be a translating device instead of a rotating or pivoting device. For example, as shown in FIG. 8, redirect 86 may be a shuttle configured to oscillate within a corresponding slot in the direction of axis 59. In the disclosed example of FIG. 8, redirect 86 may still be associated with linear actuator 84 (e.g., the slot may be formed within a carriage of linear actuator 84). However, it is contemplated that the oscillating redirect 86 could alternatively be associated with a stationary slot, if desired.

In some applications, even with the care taken to reduce damage to the reinforcement during travel between modules 44 and 48 (e.g., during travel through guide 80), some damage may still occur. For example, individual fibers making up the reinforcement may break, fray, and/or fuzz. If not otherwise accounted for, the broken off fibers, frayed fibers, fiber fuzz and/or other associated debris could inhibit (e.g., build up and restrict, obstruct, clog, etc.) operations of head 16. This situation may be exacerbated when the debris has been wetted with matrix and begins to agglomerate. Accordingly, in these applications, a debris removal unit ("unit") 88 may be placed at any location downstream of guide 80 and upstream of module 52 to collect the debris before it becomes problematic. It should be noted that a greater amount of debris may be collected by unit 88 as unit 88 is moved downstream of a greater number of debris-generating components. In one example, unit 88 may be placed immediately upstream of module 52.

Figure 9:
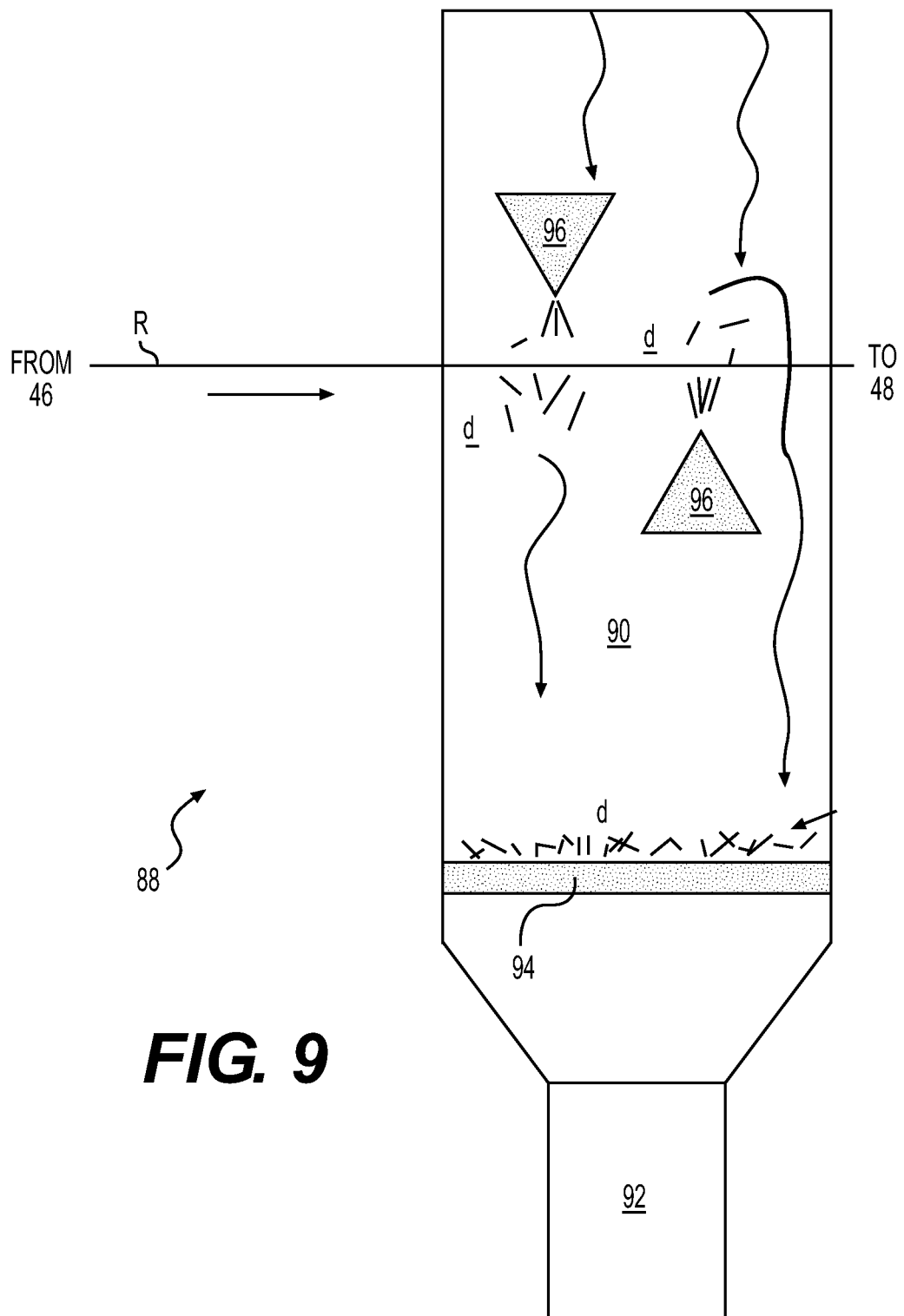
FIG. 9 is a cross-sectional illustration of an exemplary disclosed debris collecting portion of the print head of FIGS. 2 and 3.

As shown in FIG. 9, unit 88 may include, among other things, a chamber 90 through which the reinforcement R passes during its travel toward module 52. An inlet and an outlet of chamber 90 may be reduced, such that a pressure of the associated enclosed space may be controlled. A vacuum port 92 may be located at one side of chamber 90 (e.g., at a gravitationally lower side), and a filter 94 may be placed between the reinforcement and vacuum port 92. Vacuum port 92 may generate a flow of air (or another inert medium) across the reinforcement and through filter 94, wherein any debris d entrained in the flow becomes trapped.

In some embodiments, one or more agitators 96 may be located within chamber 90 and in proximity to the reinforcement. Agitator(s) 96 may embody any device that is configured to agitate (e.g., shake, vibrate, jiggle, wobble, etc.) the reinforcement and thereby dislodge loose debris clinging to the reinforcement. In one example, agitator(s) 96 include jets configured to direct puffs of low-pressure air against and/or across the reinforcement. A pressure of the puffs may be great enough to agitate the reinforcement without significantly moving the reinforcement from a direct travel path through chamber 90. In one specific example, the pressure of the puffs may be about 1 bar above chamber pressure.

It should be noted that unit 88 may be used to additionally or alternatively improve impregnation of the fibers. That is, agitator(s) 96 may be used to loosen the fibers, allowing more space for the matrix to move in therebetween. In this embodiment, agitator(s) 96 may be used with or without vacuum port 92 and/or filter 94, if desired.

Figure 10:
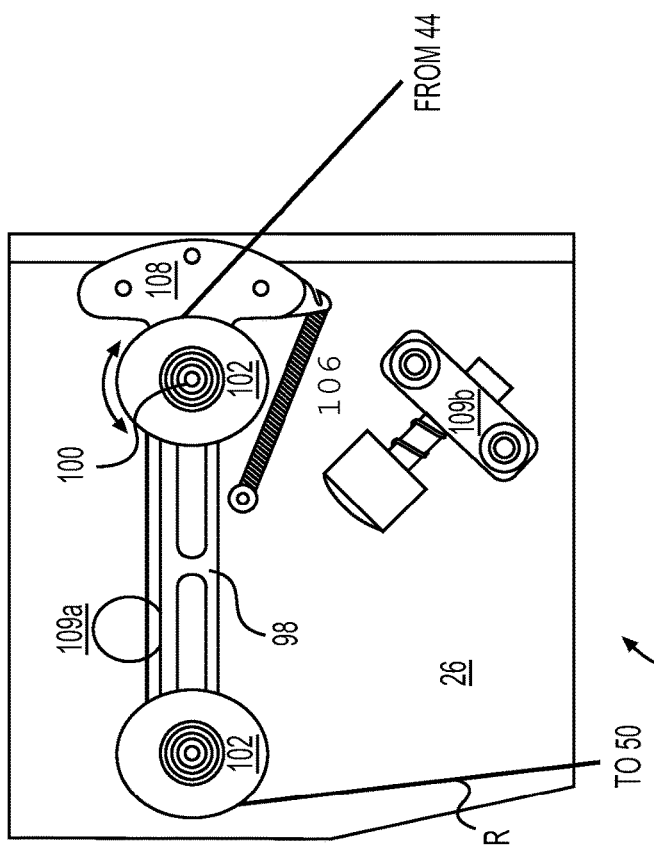
FIGS. 10 and 11 are diagrammatic and cross-sectional illustrations, respectively, of an exemplary disclosed tensioning portion of the print head of FIGS. 2 and 3.
Figure 11:
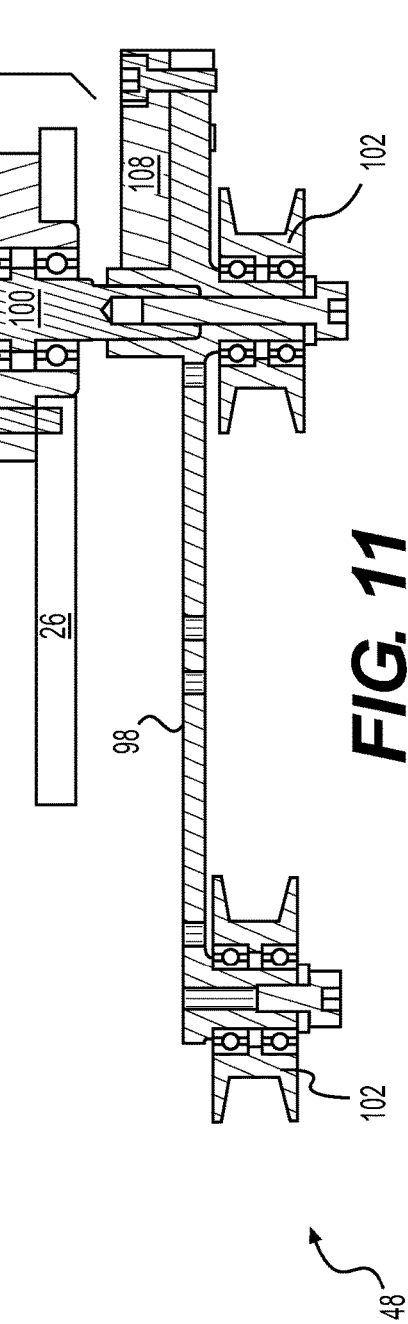

As shown in FIGS. 10 and 11, module 48 may be a subassembly located between modules 44 and 50 (e.g., relative to the travel of reinforcement through head 16) and that includes components configured to affect an amount and/or rate of the reinforcement being paid out by module 44. These components may include, among other things, a swing arm 98 pivotally connected at one end (e.g., an end closest to module 44) to lower plate 26 via a pivot shaft 100, a redirect 102 rotatably mounted at each end of swing arm 98, and a rotary sensor 104 (e.g., an sensor, potentiometer, etc.—shown only in FIG. 11) connected to rotate with pivot shaft 100 (e.g., at a side of lower plate 26 opposite swing arm 98).

In the disclosed embodiment, because the pivot point of swing arm 98 is located at an end, swing arm 98 may not be balanced about the point. If unaccounted for, this imbalance could cause swing arm 98 to function differently as head 16 is tilted to different angles. Accordingly, in some applications, a counterweight 108 may be connected to swing arm 98 at a side opposite the free end of swing arm 98.

In some embodiments, swing arm 98 may be biased (e.g., via one or more springs 106) toward a centered or neutral position. Spring 106 may extend from one or more anchors on lower plate 26 to an end of counterweight 108 (e.g., a gravitationally lower end away from plate 24). In this embodiment, spring 106 is a tension spring. It is contemplated, however, that a single torsion spring mounted around pivot shaft 100 could alternatively be utilized to bias swing arm 98, if desired.

During operation, as the reinforcement is pulled out at an increasing rate from head 16, swing arm 98 may be caused to rotate counterclockwise (e.g., relative to the perspective of FIG. 10) to provide a generally constant tension (e.g., about 0-5 lbs or about 0-1 lb) within the reinforcement. This rotation may result in a similar input rotation to sensor 104, which may responsively generate an output signal directed to controller 20 indicative of the increasing rate. The signal may be directed to module 44, resulting in increased payout of the reinforcement from creel 19, thereby allowing swing arm 98 to return back towards its nominal position. As the rate of reinforcement being pulled from head 16 decreases, spring 106 may rotate swing arm 98 in the clockwise direction to provide the generally constant tension within the reinforcement. During this clockwise motion, sensor 104 may again generate a signal indicative of the rotation and direct this signal to controller 20 for further processing and control over module 44.

One or more end-stops 109 may be associated with module 48 to limit a range of rotation of swing arm 98. In the disclosed embodiment, two different end-stops are provided, including a hard end-stop 109a and a high-tension end stop 109b. Swing arm 98 may naturally rest against hard end stop 109a due to the bias of spring 106. Swing arm 98 be selectively driven into high-tension end stop 109b during select fabrication events (e.g., during a severing event).

It should be noted that, although a single module 48 is illustrated within print head 16, it is contemplated that multiple modules 48 could alternatively be utilized. In this embodiment, modules 48 could be the same or different (e.g., have different spring and/or response rates) and placed in series, if desired.

Module 46 may be configured to direct a desired amount of matrix at a specified rate under specified conditions to module 50 for wetting of the reinforcements received from module 48. As shown in FIGS. 12 and 13, module 46 may be an assembly of components that receive, condition and meter out matrix M from a disposable cartridge 110. These components may include, among other things, a vessel 112 having an inlet 114 configured to receive cartridge 110, a cap 116 configured to close off inlet 114, and an outlet 118 through which the matrix is selectively pressed from cartridge 110. In one embodiment, vessel 112 is generally cylindrical, and cap 116 is threaded to internally receive and connect to an end of vessel 112. A port 120 may be formed within cap 116 to allow communication with a pressure-regulated medium (e.g., air).

Cartridge 110 may include a generally cylindrical and flexible membrane 122 having a first end and a second end. A piston 124 may be connected at the first end to membrane 122, and an outlet port 126 may be connected at the second end to membrane 122. With this configuration, as the pressure-regulated medium is directed into vessel 112 (e.g., via cap 116), the pressure of the medium may act against piston 124, generating a force directed toward outlet port 126 that causes membrane 122 to controllably collapse. The collapse of membrane 122 may force matrix out of membrane 122 through port 126. With this configuration, a pressure and/or a flow rate of the medium into vessel 112 via inlet port 120 may correspond with an amount and/or a flow rate of matrix out of membrane 122 through outlet port 126 and outlet 118. It is contemplated that a linear actuator rather than the pressurized medium may be used to push against piston 124 and collapse flexible membrane 122, if desired. It is also contemplated that membrane 122 may not collapse—instead, piston 124 may be pushed lengthwise through membrane 122 to thereby force the matrix out of cartridge 110.

In some applications, control over the amount and/or flow rate of matrix from module 46 via regulation of the medium through inlet port 120 may not be as precise as desired. In these applications, a metering valve 128 may be situated downstream of vessel 112 and configured to selectively adjust the amount and/or flow rate of the matrix passing to module 50. In one embodiment, the matrix exiting vessel 112 may pass through a flexible passage 130, and valve 128 may be configured to selectively pinch and thereby restrict flow through passage 130 (e.g., in response to signals from controller 20).

During discharge of the matrix from vessel 112, care should be taken to avoid depletion of matrix from cartridge 110. For this reason, a level sensor 132 may be associated with membrane 122 and configured to generate a signal indicative of an amount of matrix consumed from and/or remaining within membrane 122. In the depicted example, level sensor 132 is an optical sensor (e.g., a laser sensor) configured to generate a beam 134 directed through a transparent portion of vessel 112 from the discharge end of membrane 122 to piston 124. The beam may reflect off piston 124 and be received back at sensor 132, wherein a comparison of outgoing and incoming portions of the beam produces a signal indicative of the consumed and/or remaining matrix amount. It is contemplated that sensor 132 could alternatively be located at an opposing end of cartridge 110 and configured to detect a location of piston 124 without first passing through membrane 122, if desired. It is further contemplated that a non-optical type of sensor (e.g., an embedded magnet/hall effect sensor) could alternatively or additionally be utilized to generate the matrix-related signal, if desired.

It should be noted that the matrix contained within membrane 122 may be light-sensitive. Accordingly, care should be taken to avoid exposure that could cause premature curing. In the disclosed embodiment, membrane 122 may be tinted, coated (internally and/or externally), or otherwise shielded to inhibit light infiltration. For example, membrane 122 may be fabricated from an amber material that inhibits (e.g., blocks) light having a wavelength of about 550 nm or less. In this example, beam 134 may have a wavelength greater than 550 nm, such that the amber material does not disrupt its passage to and from piston 124 from the discharge end.

In some applications, handling and/or curing characteristics of the matrix may be affected by a temperature of the matrix inside of module 46. For this reason, module 46 may be selectively heated, cooled, and/or insulated accordingly to one or more predetermined requirements of a particular matrix packaged within cartridge 110 and loaded into vessel 112. For example, one or more heating elements (e.g., electrodes) 136 may be mounted inside of and/or outside of vessel 112 and configured to generate heat conducted through membrane 122 to the matrix therein. Controller 20 may be in communication with heating element(s) 136 and configured to adjust the output of heating element(s) 136 based on a known and/or detected temperatures of the matrix in module 46.

It may be important, in some situations, to insulate module 46 from other components of head 16. In the disclosed embodiment, vessel 112 may be mounted to housing 22 (e.g., upper and/or lower plates 24, 26) via one or more mounting brackets 138. Mounting bracket(s) 138 may be separated from vessel 112 by way of a first insulating layer 140 and from housing 22 via a second insulating layer 142. In addition, mounting bracket(s) 138 may be fabricated from a heat conducting material such that, if heat is transferred away from vessel 112 into mounting bracket(s) 138, the heat may be quickly dissipated to the air.

As shown in FIGS. 14, 15 and 16, clamping module 50 may be a subassembly having components that cooperate to selectively clamp the reinforcement and thereby inhibit movement (e.g., any movement or only reverse movement) of the reinforcement through head 16. This may be helpful, for example, during severing of the reinforcement away from structure 12, such that tensioning module 48 does not unintentionally pull the reinforcement back through head 16. This may also be helpful during off-structure movements of head 16 (e.g., when no reinforcement should be paying out) and/or briefly at a start of a new payout (e.g., while tacking the reinforcement at the anchor). In each of these scenarios, clamping module 50 may selectively function as a check-valve, ensuring unidirectional movement of the reinforcement through head 16. By allowing at least some movement of the reinforcement at all times, damage to the reinforcement may be reduced. It is contemplated, however, that motion of the reinforcement could alternatively or selectively be inhibited in both directions when module 48 is activated, if desired.

The components of module 50 may include, among other things, a yoke 144 that is removably connectable to lower plate 26, a clutched roller 146 that is pivotally connected to yoke 144 via a shaft 148, and an actuator (e.g., a linear cylinder) 150 that is mounted to yoke 144 at a side opposite roller 146 and configured to selectively engage (e.g., press the reinforcement against) clutched roller 146. In one embodiment, an additional roller (clutched or free-rolling) 152 may be pivotally connected at an end of actuator 150 (e.g., via a shaft 154) and configured to engage roller 146 of yoke 144. It is contemplated that one or both of rollers 146, 152 could be replaced with a plate or foot, if desired.

As shown in FIGS. 14 and 15, yoke 144 may have a generally C-shaped cross-section. The reinforcement received from module 48 may pass through the opening of the C-shape at a location between rollers 146 and 152. When actuator 150 is moved to a retracted position (e.g., during a threading event—shown in FIGS. 14-16), roller 152 may be pulled away from the reinforcement, such that movement of the reinforcement through yoke 144 in any direction is uninhibited by rollers 146 and 152. When actuator 150 is in an extended position (not shown), roller 152 may force the reinforcement downward against roller 146, thereby allowing translation of the reinforcement only on the payout direction when rollers 146 and 152 rotate about their respective shafts (e.g., only in the payout direction facilitated by internal clutches). Because rollers 146 and 152 may rotate at a same rate that the reinforcement passes through module 50, damage to the reinforcement may be minimal (i.e., because there is no relative motion between the reinforcement and the rollers).

It may be important, in some applications, to ensure parallel alignment between axis of shafts 148 and 154. Parallel alignment may promote line-to-line contact and damage-free sandwiching of the reinforcement therebetween. In these applications, the orientation of shaft 148 may be fixed relative to yoke 144, while shaft 154 may be connected to actuator 150 (e.g., to a plunger of actuator 150) via a pivot pin 156. Pivot pin 156 may allow the axis of shaft 154 (and roller 152) to pivot within a plane passing through the axis of shaft 148 during engagement of roller 152 with roller 146 until the line-to-line contact is achieved (e.g., within a threshold amount). In addition, in some embodiments, one or both of rollers 146 and 152 may be wrapped in a compliant material (e.g., rubber) to further promote parallel alignment, if desired.

During clutched operation of rollers 146 and 152, any generated torque may be transferred back through yoke 144 to lower plate 26. For example, shafts 148 and 154 may include features (e.g., flat-sided heads) that mechanically lock with corresponding features (e.g., slots) of yoke 144. Any rotations induced within rollers 146 and 152 that are caused by reverse motion of the reinforcement back into head 16 may be inhibited by the mechanical lock.

The clutching of rollers 146 and 152 may allow reinforcement to be pulled through module 50, even when module 50 has been activated. This may allow for relaxed timing precision between cutting and feeding events. It is contemplated that, in some applications, module 50 may be active any time head 16 is active. This may allow for reduced part count (e.g., elimination of actuator 150) and/or increased component reliability.

In some applications, activation of module 50 may be used to detect an operational status of another module of head 16. For example, when the other modules of head 16 are fully operational and module 50 is activated to clamp the continuous reinforcement, no subsequent payout of the continuous reinforcement should be detected. This includes motion of head 16 away from a point of reinforcement severance. That is, if severing has been commanded of module 56 by controller 20 and module 50 has been previously activated, failure of module 56 to fully sever the reinforcement may correspond with additional reinforcement being pulled through the clutched rollers of module 50 during movement of head 16 away from the severance location. The pulling of additional reinforcement may be detected by sensor 104, and controller 20 may respond accordingly. For example, controller 20 may place head 16 into a hold status, thereby allowing an operator to service or replace module 56.

Figure 17:
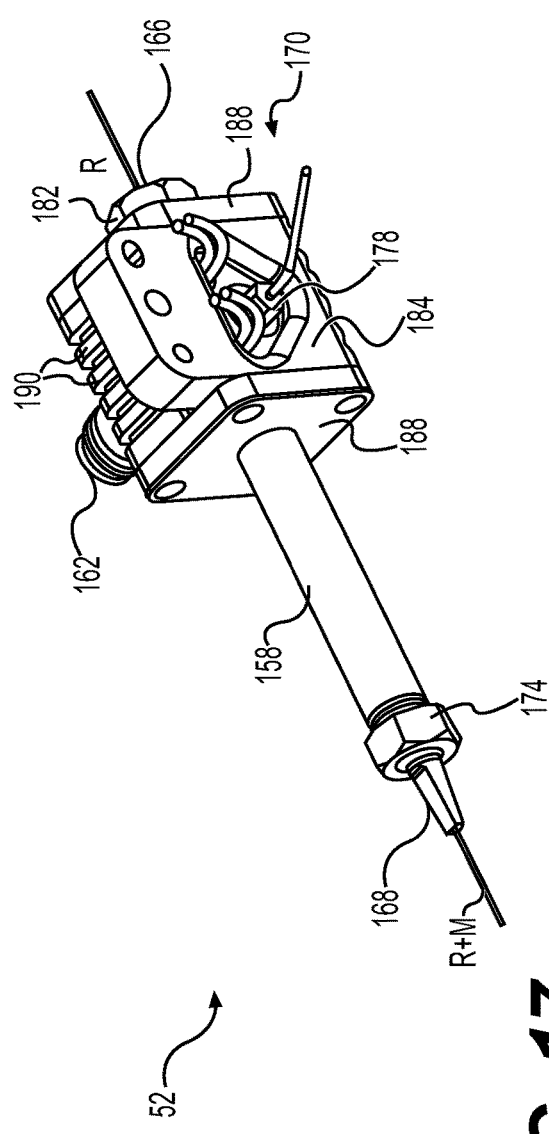
FIGS. 17 and 18 are diagrammatic and cross-sectional illustrations, respectively, of an exemplary disclosed wetting portion of the print head of FIGS. 2 and 3.
Figure 18:
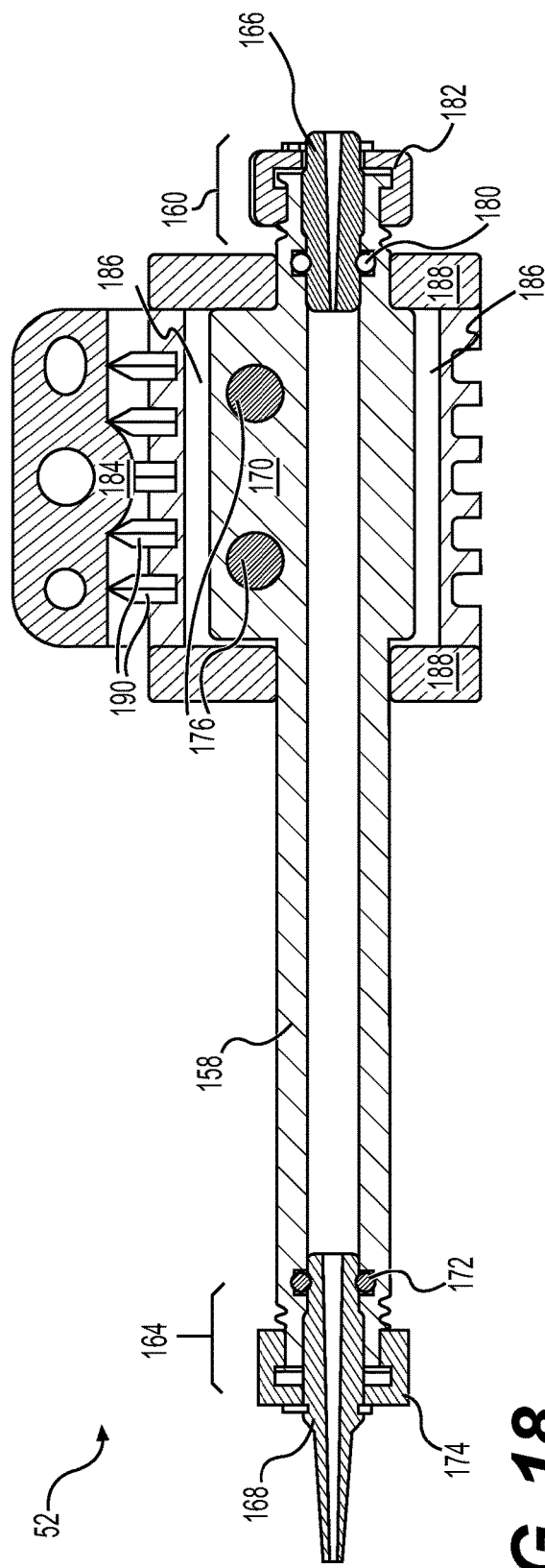

As shown in FIGS. 17 and 18, wetting module 52 may be a subassembly that includes, among other things, a tubular body 158 having a fiber inlet 160 configured to receive reinforcement from module 50, a matrix inlet 162 (shown only in FIG. 17) configured to receive matrix from module 46, and a composite outlet 164 configured to discharge matrix-wetted reinforcements toward module 58; a first nozzle 166 removably connected to fiber inlet 160; a second nozzle 168 removably connected to composite outlet 164; and a heater 170 associated with body 158 and disposed between fiber inlet 160 and composite outlet 164 (e.g., closer to fiber inlet 160).

Reinforcement entering module 52 may pass first through nozzle 166. In one embodiment, nozzle 166 has a cross-sectional (e.g., rectangular, circular, triangular, or other polygonal or elliptical) shape substantially matching a cross-sectional shape of the reinforcement. An area of the cross-section may taper from a larger upstream end to a smaller downstream end. This tapering may facilitate threading of the reinforcement through nozzle 166. The area of the downstream cross-section may be selected to be just larger than a cross-sectional area of the reinforcement, such that reverse passage of matrix through the downstream cross-section may be restricted. In one embodiment, the downstream cross-sectional area of nozzle 166 may be 0-30% (e.g., 10-20%) greater than the cross-sectional area of the reinforcement. A seal 172 may be disposed annularly between an outer surface of nozzle 166 and an inner surface of body 158, and a fastener (e.g., a nut) 174 may be used to press nozzle 166 into body 158. Body 158 may include one or more clocking features (e.g., flat lands) that engage one or more corresponding clocking features (e.g., flat lands) of nozzle 166, such that body 158 and nozzle 166 (and the reinforcement passing through nozzle 166) may be oriented in a desired manner relative to each other (e.g., with a widest direction of the nozzle opening being oriented horizontally).

Pressurized matrix may be directed into body 158 at the same time that the reinforcement is discharging from nozzle 166 into body 158. The matrix may infiltrate and at least partially wet (e.g., fully saturate and coat) the reinforcement prior to the reinforcement reaching nozzle 168. In some applications, infiltration and/or saturation of the reinforcement with the matrix may be enhanced as a temperature of the matrix is elevated (e.g., as a viscosity of the matrix is decreased). In these applications, the temperature may be elevated via one or more cartridges 176 of heater 170. A temperature sensor 178 may be selectively employed by controller 20 to help regulate operation of cartridges 176 in a feedback-manner. A pressure sensor (not shown) located within body 158 may similarly be employed by controller 20 to help regulate a pressure applied to cartridge 110 within module 46.

The reinforcement wetted with matrix (i.e., the composite material) may be discharged from body 158 through nozzle 168. Like nozzle 166, nozzle 168 may also have a cross-sectional (e.g., rectangular) shape substantially matching the cross-sectional shape of the reinforcement. An area of the cross-section may taper from a larger upstream end to a smaller downstream end to facilitate threading of the reinforcement through nozzle 168. The area of the downstream cross-section may be selected to be larger than a cross-sectional area of the reinforcement, such that a desired amount of matrix clinging to the reinforcement may pass through the downstream cross-section. In one embodiment, the downstream cross-sectional area of nozzle 168 may be 0-120% greater than the cross-sectional area of the reinforcement. A seal 180 may be disposed annularly between an outer surface of nozzle 168 and an inner surface of body 158, and a fastener (e.g., a nut) 182 may be used to press nozzle 168 into body 158. Body 158 may include one or more clocking features (e.g., flat lands) that engage one or more clocking features (e.g., flat lands) of nozzle 168, such that body 158, nozzle 166, and nozzle 168 (and the reinforcement passing through nozzles 166 and 168) may be oriented in a desired manner relative to each other.

Body 158 may be operably mounted to primary plate 26a (referring to FIGS. 2 and 3) in a thermally isolating manner. For example, a mounting block 184 may be placed annularly around body 158, with an air gap 186 located therebetween. A pair of axially spaced-apart mounting plates 188 may extend radially from body 158 outward through air gap 186 and connected to opposing ends of mounting block 184. Fins, vanes, or other heat transferring components 190 may extend from mounting block 184 to dissipate any excess heat that happens to pass through air gap 186 into the air before the heat can be transferred into primary plate 26a.

Figure 19:
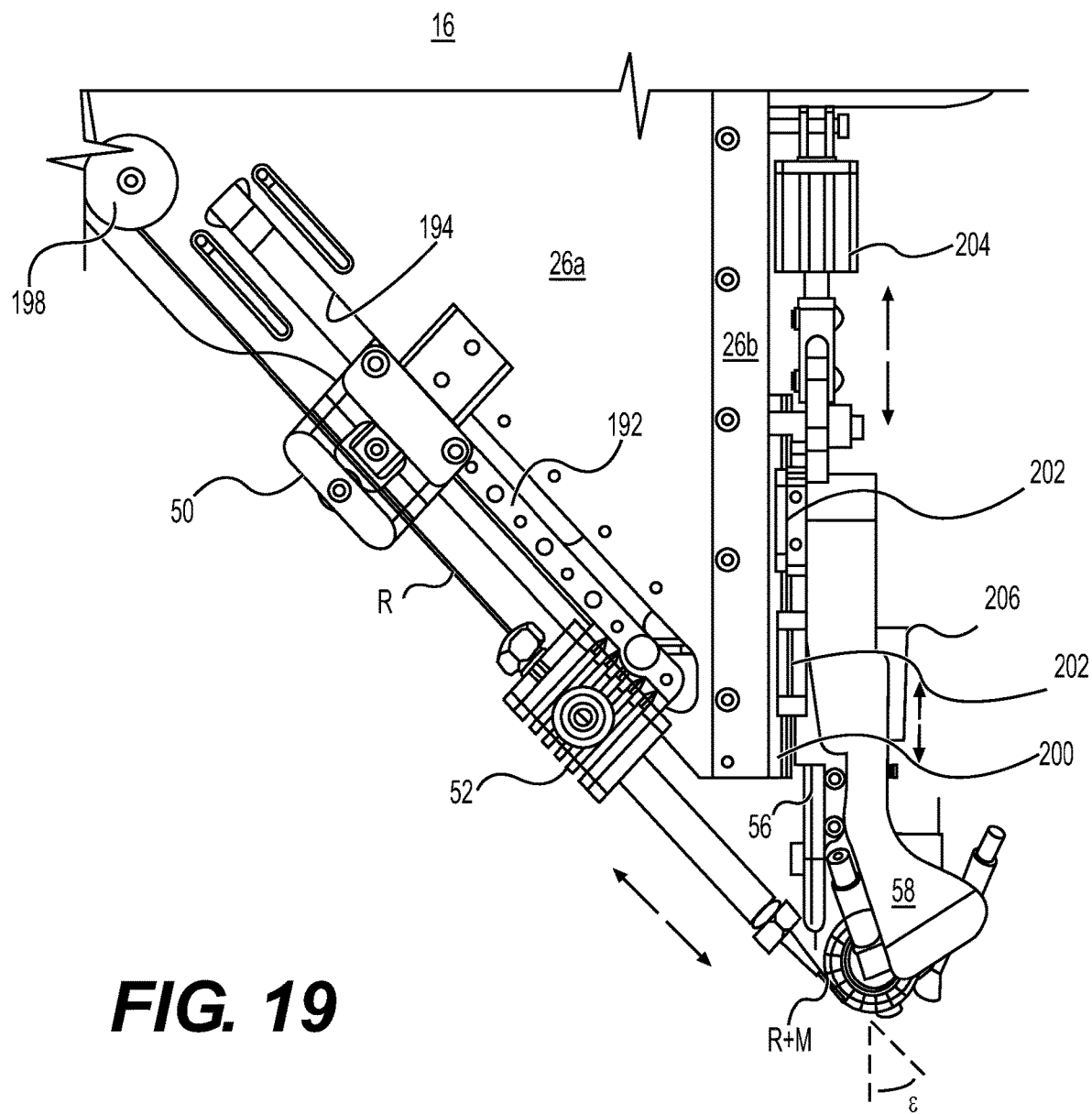
FIGS. 19 and 20 are diagrammatic illustrations of exemplary disclosed feeding, cutting, compacting and curing portions of the print head of FIGS. 2 and 3.
Figure 20:
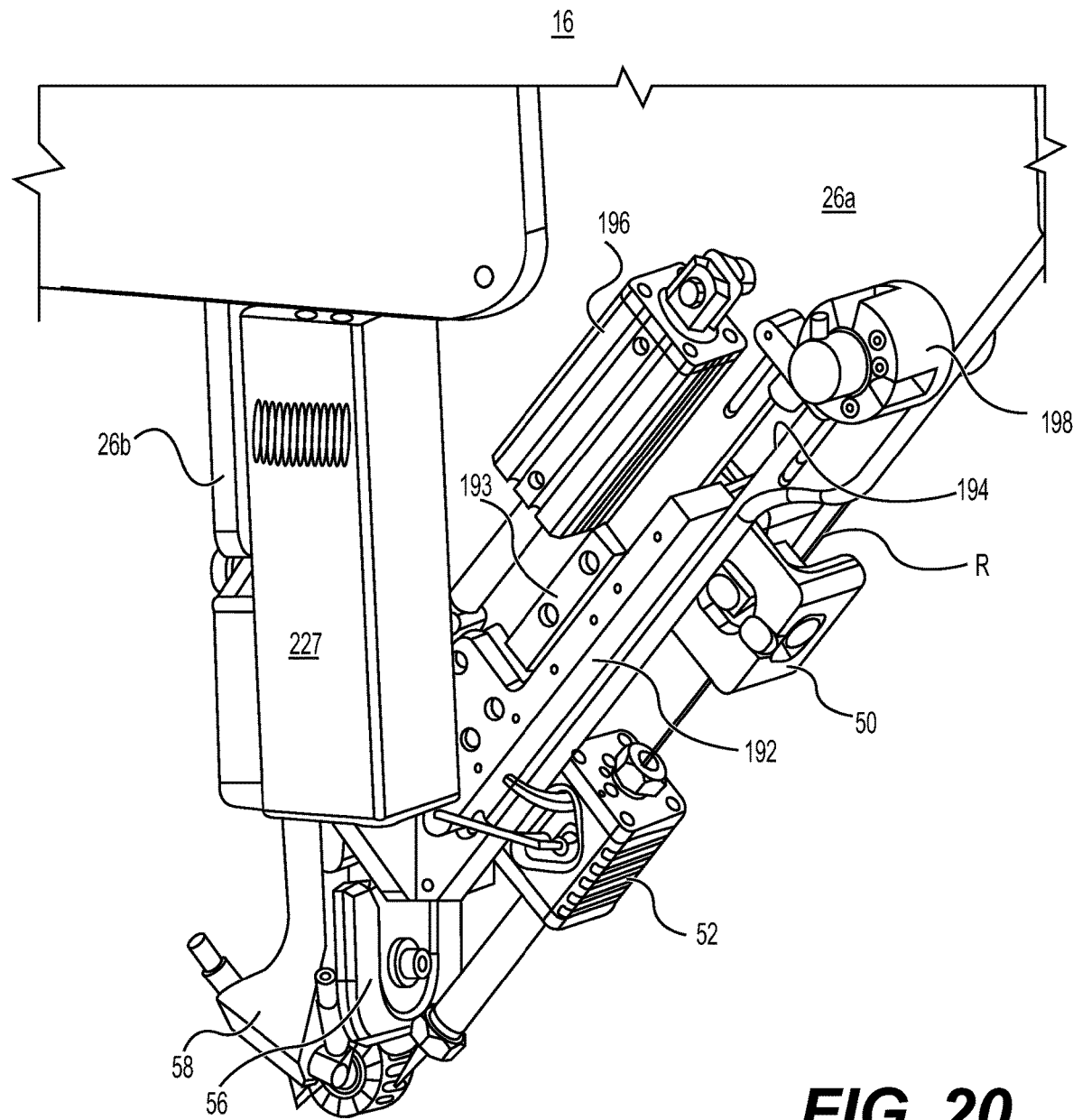

Modules 50 and 52 may be configured to move together relative to the rest of head 16. This movement may occur, for example, before, during, and/or after a severing event (e.g., after completion of a print path, during rethreading and/or during start of a new print path). As shown in FIGS. 19 and 20, modules 50 and 52 may be rigidly connected to each other via a bracket 192 that translates (e.g., rolls and/or slides linearly) along a rail 193 (shown only in FIG. 20) affixed to primary plate 26a. Bracket 192 may extend through a slot 194 formed within primary plate 26a, with modules 50 and 52 located at a first side of primary plate 26a and rail 193 located at a second side of primary plate 26a. An actuator 196 may be mounted to primary plate 26a at the second side, and be mechanically linked to bracket 192. With this configuration, an extension or retraction of actuator 196 may result in translation of bracket 192 and modules 50, 52 along rail 193. In one embodiment, actuator 196 is a linear actuator (e.g., a cylinder). It is contemplated that actuator 196 could alternatively embody a rotary actuator (e.g., a motor/lead screw), if desired. In either embodiment, a sensor may be associated with actuator 196 and configured to generate a signal indicative of a position of actuator 196 and/or modules 50, 52.

It should be noted that, during the translation of bracket 192 and modules 50, 52 along rail 193, the reinforcement passing through modules 50, 52 may remain stationary and slide through modules 50 and 52 or translate with modules 50 and 52, depending on an actuation status of module 50. For example, when module 50 is active and clamping the reinforcement at a time of translation, the reinforcement may translate together with modules 50 and 52. Otherwise, a tension within the reinforcement may function to hold the reinforcement stationary, move the reinforcement in a direction opposite the translation, or move the reinforcement in the same direction of the translation at a different speed. A rotary sensor 198 may be placed just upstream of module 50 to track the motion and payout of the reinforcement during these and other events. The motion of modules 50, 52 may be coordinated with the motions of modules 56 and 58 that will be described in more detail below.

As also shown in FIG. 19, modules 56 and 58 may selectively be moved together relative to gusset 26b. For example, a rail 200 may be affixed to gusset 26b and oriented vertically relative to the perspective of FIG. 19. In one embodiment, an axis of rail 200 may be generally parallel (and aligned, in some embodiments) with an axis of coupler 18 and/or a final rotation joint of support 14 (referring to FIG. 1). Each of modules 56 and 58 may include a carriage 202 configured to slide and/or roll along rail 200 in the vertical direction, and a common linear actuator 204 may be connected to translate modules 56 and 58 together along rail 200. In one embodiment, actuator 204 is directly connected to a first end of module 58, and module 56 is connected to a midpoint of module 58. Other configurations are also possible.

The translation direction of modules 50, 52 may be generally aligned with a center axis of outlet 54 (e.g., of the downstream nozzle 168—referring to FIG. 18) and tilted relative to an axis of coupler 18. That is, module 52 may be tilted at an angle E relative to the axis of coupler 18 and relative to extension/retraction motions of module 58 and translation of module 56 that will be discussed in more detail below. In one embodiment, the angle E may be about 30-60° (e.g., about 45°). A shallower angle may decrease the formfactor of head 16, while a deeper angle may facilitate greater precision by allowing nozzle 168 to be closer to module 58. The translation of modules 50, 52 may be coordinated with the motions of modules 56 and 58 and described in more detail below.

Figure 21:
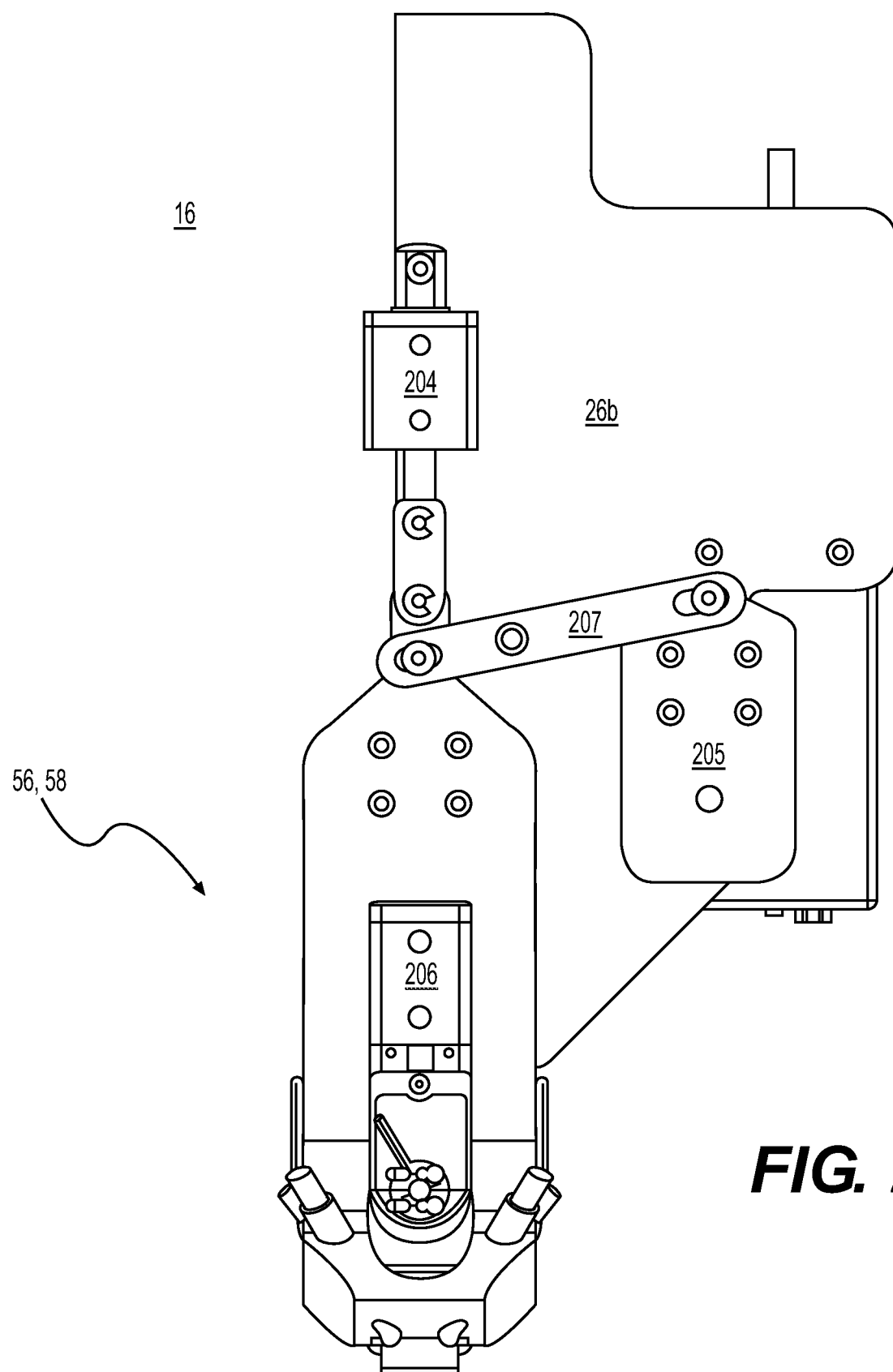
FIG. 21 is a diagrammatic illustration of the exemplary disclosed cutting, compacting and curing portions of FIGS. 19 and 20.

In some applications, a counterbalance 205 may be operatively connected to modules 56 and/or 58. In the embodiment of FIG. 21, counterbalance 205 is connected to module 58 via a lever arm 207. A first end of lever arm 207 may be pivotally connected to counterbalance 205, while a second end may be pivotally connected to module 58. Lever arm 207 may be pinned to gusset 26b at a location between the first and second ends. With this arrangement, a compacting force imparted by module 58 may remain relatively constant, regardless of tilting of head 16.

Module 56 may also be configured to selectively move relative to module 58. For example, an actuator 206 may link modules 56 and 58 together and be configured to selectively extend module 56 away from module 58 in the axial direction of rail 200. Although shown as translating relative to module 58, it is contemplated that module 56 could alternatively or additionally rotate between the stowed and deployed positions, if desired.

Figure 22:
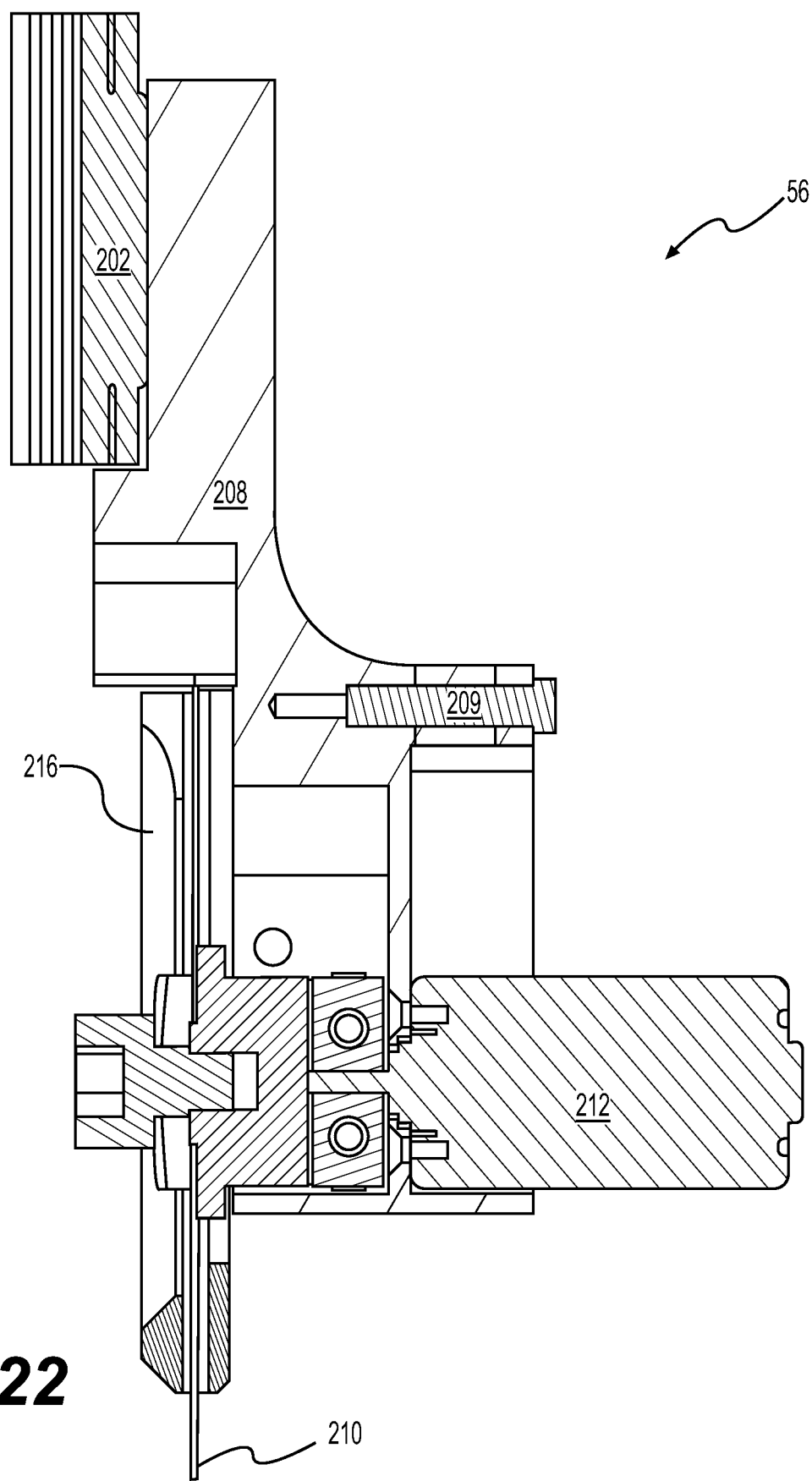
FIGS. 22 and 23 are cross-sectional and exploded view illustrations of the exemplary disclosed cutting portion of FIGS. 19-21.
Figure 23:
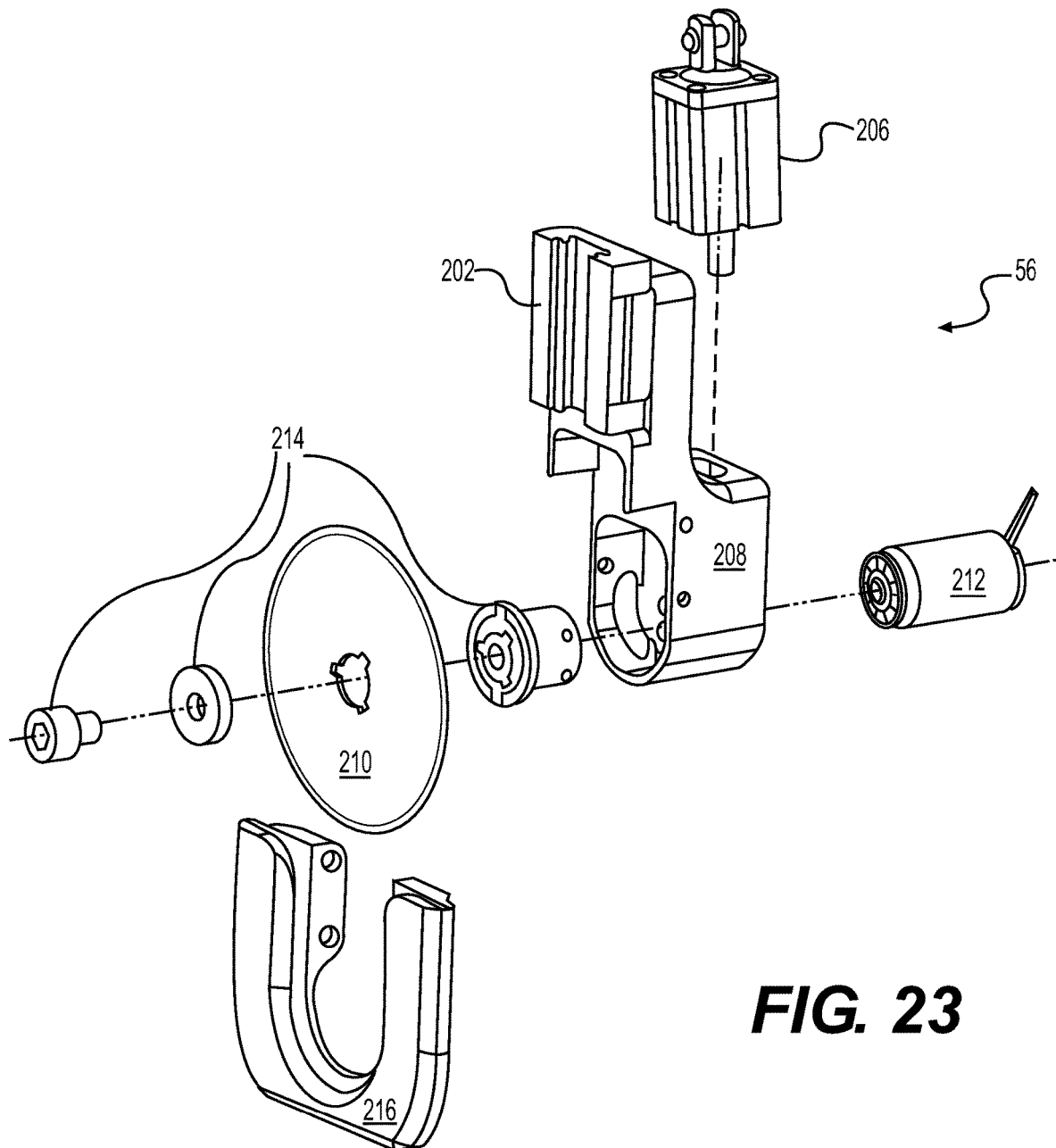

As shown in FIGS. 22 and 23, module 56 may be an assembly of components that cooperate to sever the reinforcement passing from module 52 to module 58. These components may include, among other things, a mounting bracket 208 connecting an output link of actuator 206 to carriage 202 (e.g., via a fastener 209), a cutting mechanism (e.g., a rotary blade) 210; a cutting actuator (e.g., a rotary motor) 212 connecting mechanism 210 to bracket 208 via associated hardware (e.g., bearings, washers, fasteners, shims, etc.) 214, and a cover 216 configured to at least partially enclose (e.g., enclose on at least two sides) cutting mechanism 210. With this configuration, activation of actuator 212 may cause mechanism 210 to rotate such that, during extension of module 56 away from module 58, mechanism 210 may sever the reinforcement. Cover 216 may protect against unintentional contact with a cutting edge of mechanism 210. It is contemplated that actuator 212 may be configured to affect a different motion (e.g., a vibration, a side-to-side translation, etc.) of mechanism 210, if desired.

It should be noted that while cutting mechanism 210 has been described as a rotary blade, a serrated, hexagonal, or other polygonal shaped blade may improve severing, in some situations.

Figure 26:
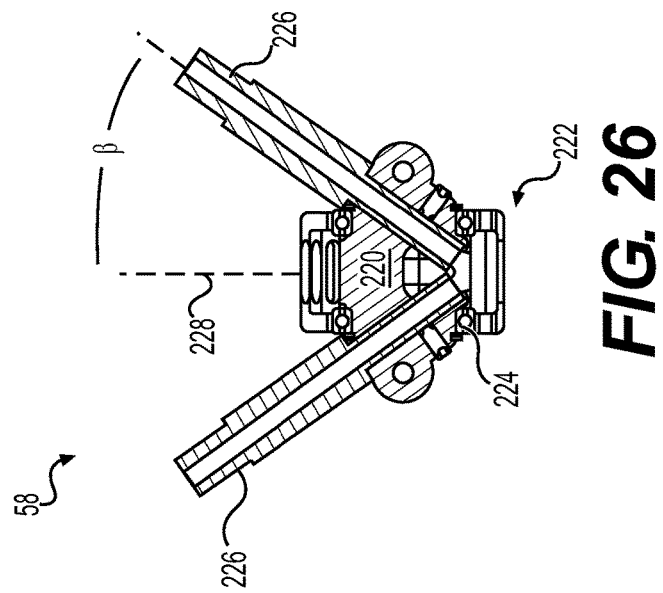
FIGS. 24 and 25 are diagrammatic illustrations and FIG. 26 is a cross-sectional illustration of the curing and compacting portions of FIGS. 19-21.
Figure 24:
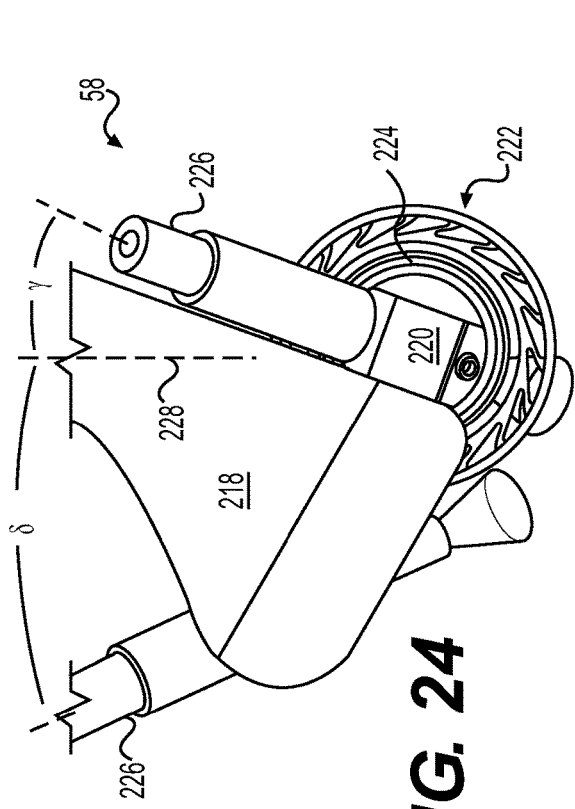
Figure 25:
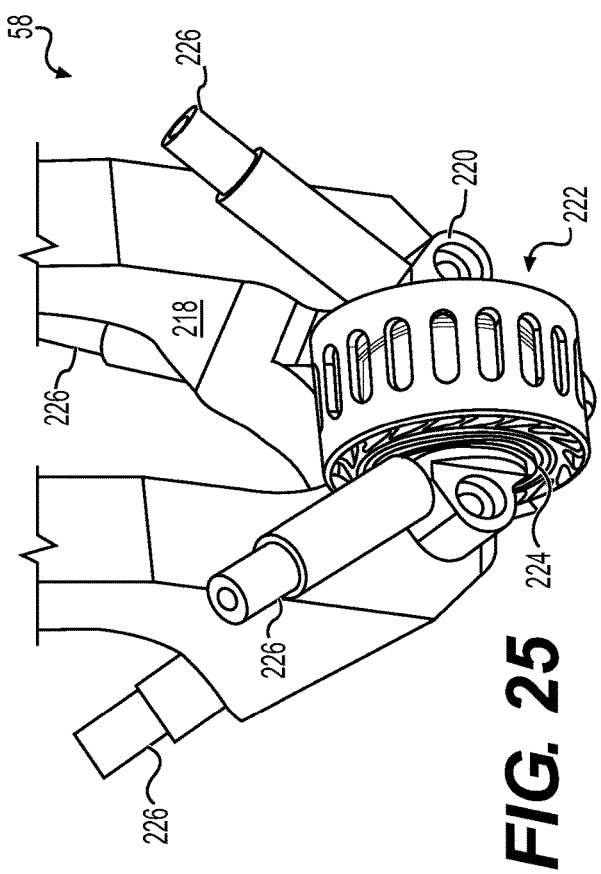

A portion of module 58 is shown enlarged in FIGS. 24, 25 and 26. As shown in these figures, module 58 may be a self-contained assembly of multiple components that interact to selectively compact and at least partially cure matrix-wetted reinforcements during discharge from head 16. These components may include, among other things, a mounting bracket 218 (shown only in FIGS. 24 and 25—omitted from FIG. 26 for clarity) that extends between carriage 202, actuator 204, and module 56; a shaft 220 removably connected to bracket 218 (e.g., via one or more fasteners—not shown), a roller subassembly 222 rotationally mounted on shaft 220 via one or more bearings 224, and any number of cure sources 226 mounted to one or both of bracket 218 and shaft 220.

Bracket 218 may have an opening formed therein to accommodate and provide a reaction base for actuator 206 of module 56 (referring to FIG. 23) during relative motion induced by actuator 206 between modules 56 and 58. An extension of actuator 204 may cause bracket 218 to press roller subassembly 222 against a material discharging from head 16, thereby compacting the material with a force related to the extension distance. In some embodiments, a resilient mechanism (e.g., spring) may be located between bracket 218 and subassembly 222, such that the force of the compaction is related to the displacement caused by actuator 206 and a spring-force of the resilient mechanism.

In the disclosed embodiment, four different cure sources 226 (e.g., light sources, such as light pipes that extend from one or more U.V. lights 227 or lasers—shown in FIG. 20) are implemented within module 58. Two of these sources 226 may be mounted directly to shaft 220 at a leading side relative to a movement direction of head 16 (e.g., entering axial ends of shaft 220), while two sources 226 may be mounted directly to bracket 218 at a trailing side. Leading sources 226 may terminate within roller subassembly 222, for radiation radially outward through an annular surface of roller subassembly 222 at the tool center point of head 16. Trailing sources 226 may terminate just above the material discharging from head 16 at a location downstream of roller subassembly 222.

The orientation of each source 226 may be designed to provide a desired level of curing to a particular portion of the discharging material. In one embodiment, a transverse angle β (shown in FIG. 26) located between a compaction axis 228 of module 58 (e.g., an axis passing in a direction of force exerted by actuator 204 that is substantially normal to a surface of the discharging material being compacted) and an axis of each source 226 may be about 20-40° (e.g., about 30°). In this same embodiment, a fore/aft angle γ (shown in FIG. 24) located between compaction axis 228 and the axes of leading sources 226 may be about 0-20° (e.g., about 10°), while a fore/aft angle δ (shown in FIG. 24) located between compaction axis 228 and the axes of trailing sources 226 may be about 30-60° (e.g., about 45°). As will be explained in more detail below in reference to FIG. 30, the angle γ may be selected so that the associated cure energy impinges the material at a trailing side of a flat patch formed within roller subassembly 222 (e.g., starting at a tool center point in the flat patch and extending rearward). The flat patch may allow the material to be compressed flat against an adjacent layer prior to and/or while being cured. The angle δ may be selected to provide a compact form factor of head 16 at the discharge end, while directing the associated cure energy as close as possible to the tool center point of roller subassembly 222. A greater angle δ may allow for even closer exposure, but the form of head 16 may grow proportionally. The cure energy from leading sources 226 may primarily function to tack the discharging material in a desired shape and location, while the cure energy from trailing sources 226 may function to impart a deeper or greater degree of cure (e.g., a through-cure).

Figure 27:
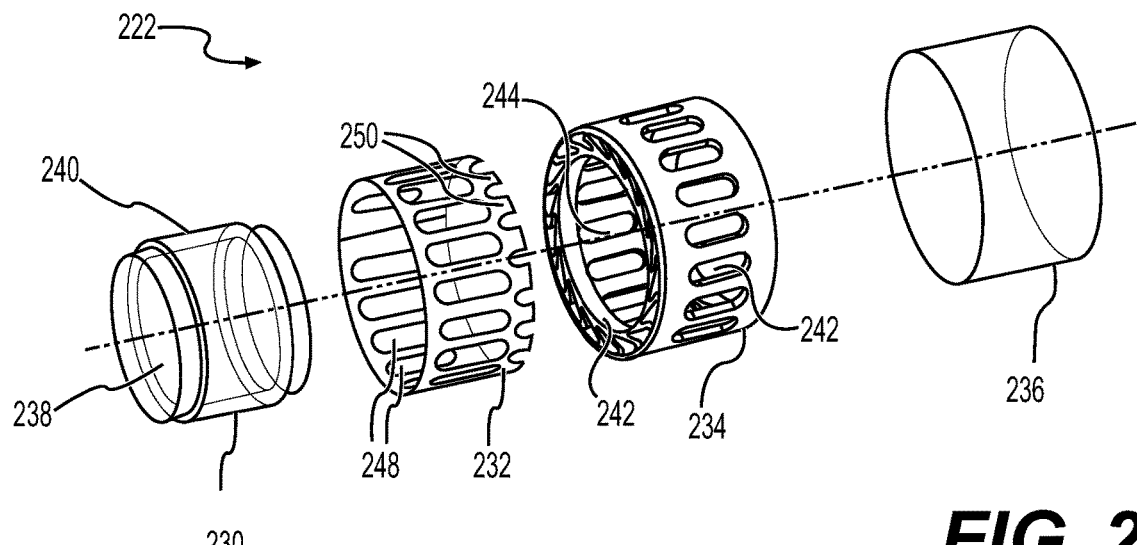
FIGS. 27, 28, 29, 30, 31, 32 and 33 are exploded view and diagrammatic illustrations of exemplary components of the curing and compacting portion of FIGS. 24 and 25.

As shown in FIG. 27, roller subassembly 222 may include, among other things an internal hub 230 that is rotationally mounted over shaft 220 via bearings 224 (referring to FIGS. 24-26), a biasing insert 232 mounted over hub 230, a compliant roller 234 mounted over insert 232, and an outer annular cover 236.

Hub 230 may have an inner annular surface 238 that steps radially outward to a larger diameter at opposing axial ends, the larger diameter at each end being configured to internally receive an outer race of a corresponding bearing 224 (referring to FIGS. 25 and 26). The inner races of bearing 224 may be supported at ends of shaft 220, and an annular gap may exist between inner annular surface 238 of hub 230 and an outer annular surface of shaft 220. In this way, hub 230 may be allowed to rotate freely relative to shaft 220, even during compressing activities of roller subassembly 222.

Hub 230 may likewise have an outer annular surface 240 that steps radially inward to a smaller diameter at the opposing axial ends, the smaller diameter at each end being configured to support corresponding ends of roller 234. Roller 234 may include inwardly extending flanges 242 (see FIG. 29) that engage the smaller diameters of outer annular surface 240. This engagement may axially align roller 234 with hub 230. In one embodiment, the compliance of roller 234 may be sufficient to rotationally bind roller 234 to hub 230. In other embodiments, an adhesive may be used to rotationally bind roller 234 to hub 230.

Figure 28:
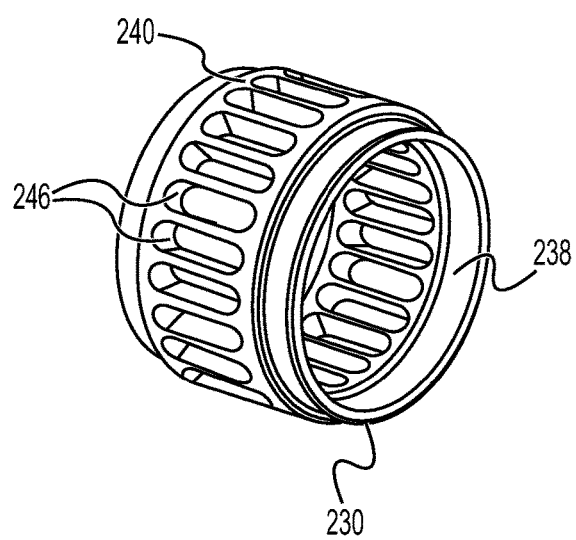

A material of hub 230 may be selected to provide rigid internal support for the other components of roller subassembly 222, as well as energy transmittance from leading sources 226 radially outward to the tool center point of head 16. In the example of FIG. 27, hub 230 is fabricated from a clear acrylic material (e.g., an acrylic core coated with an FEP sleeve). It has been found, however, that in some applications, the acrylic material may scatter or diffuse the cure energy undesirably. In these applications, an alternative material may be used. For example, as illustrated in FIG. 28, hub 230 may be fabricated from an opaque material (e.g., Delrin). Since the opaque material may not transmit the cure energy sufficiently, any number of axially extending circumferential slots 246 may be distributed around hub 230 and pass from inner surface 238 through outer surface 240. Slots 246 may facilitate the transmission of cure energy from leading sources 226 radially outward.

An annular gap may be present between outer annular surface 240 of hub 230 and an inner annular surface 244 of roller 234 (e.g., located axially between flanges 242). Insert 232 may be radially compressed, placed into this gap, and released such that a radial expansion of insert 232 biases insert 232 against inner surface 244 of roller 234. This bias may help urge any compressed portions of roller 234 to a desired cylindrical shape.

A material of insert 232 may be selected to provide the internal biasing support for roller 234. In the example of FIG. 27, insert 232 is fabricated from a spring steel. Since spring steel may not transmit cure energy sufficiently, slots 248 similar to slots 246 may be distributed around and pass radially through insert 232.

As will be explained in more detail below, any number of indexing features 250 may be formed within insert 232 to help align slots 248 with other features of roller assembly 222. In the disclosed example, features 250 may include one or more tabs that extend axially from a periphery of insert 232 at one or more axial ends. It is contemplated, however, that other indexing features known in the art (e.g., detents, catches, dogs, pawls, etc.) could be implemented, if desired.

Figure 29:
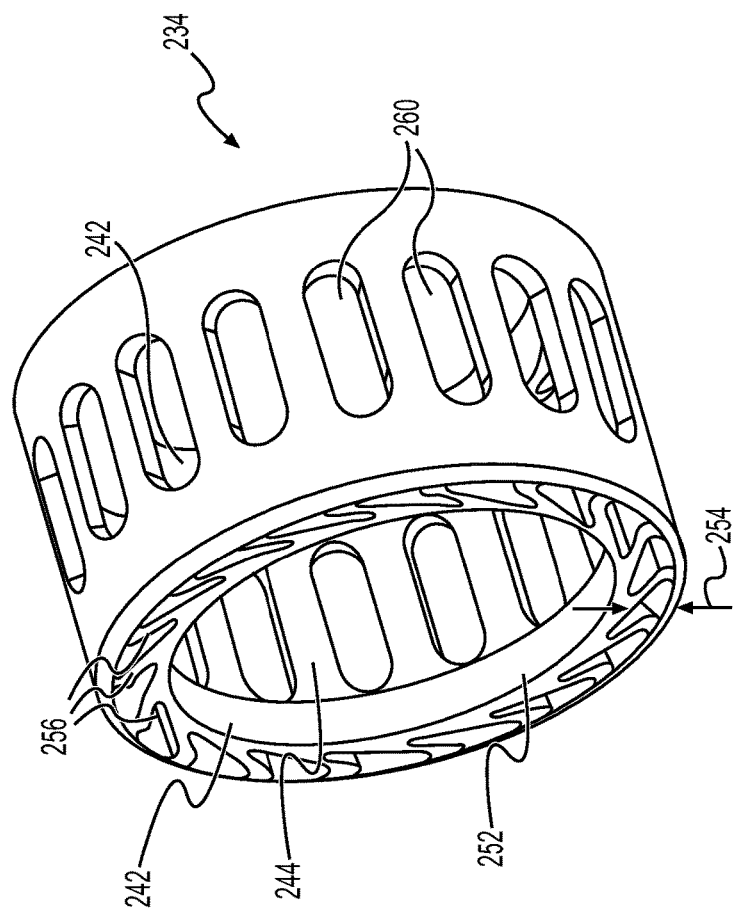

An exemplary roller 234 is illustrated in detail in FIG. 29. As shown in this figure, flanges 242 may be configured to selectively compress in a radial direction (e.g., in a direction along compression axis 228—referring to FIG. 26) at the tool center point of head 16 during compaction of the material discharging from head 16. For example, each flange 242 may include an inner race 252 that is separated from an outer surface of roller 234 by an annular gap 254. Any number of flexures 256 may extend from a tangent at inner race 252 radially through gap 254 to the annular surface of roller 234. Flexures 256 may function to bias the annular surface of roller 234 radially outward toward a nominal annular position about a center axis of roller assembly 222. During compaction at the tool center point against the discharging material, the portion of the annular surface engaging the material may be pressed radially inward. This pressing may cause flexures 256 to collapse until gap 254 is reduced or eliminated at the tool center point.

Figure 30:
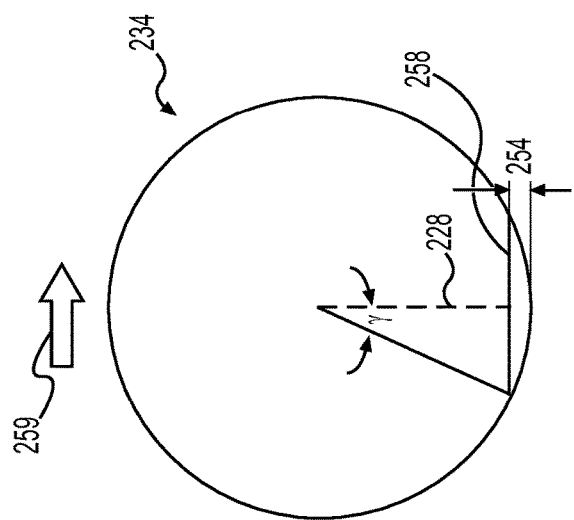

As shown in FIG. 30, the collapse of flexures 256 may result in the flat patch 258 discussed above. Patch 258 may help to press the discharging material flat against an underlying surface, while also facilitating separation of the material at a trailing side (e.g., relative to a normal travel direction of head 16 represented by an arrow 259). In one embodiment, gap 254 and the associated collapse dimension of roller 234 may be about equal to 4-5% of an outer diameter of roller 234. This collapse dimension may result in the flat patch 258 having a length in the travel direction of about 40-45% of the outer diameter. As discussed above, the angle γ of the leading sources 226 may be about 0-20°, such that the discharging material may be compacted within a leading half of patch 258 and exposed to cure energy only in the trailing half.

A material of roller 234 may be selected to provide for the above-discussed flexing and to withstand the curing environment (e.g., electromagnetic radiation generated by sources 226 and any resulting exothermic reactions), without permanently deforming. In one example, roller 234 is fabricated from silicone having a hardness of about 20-50 A-Shore (e.g., about 40 A-Shore). To prevent undesired scattering or diffusion of cure energy, the silicone may be dyed or coated with an energy blocking tint. To facilitate energy transmission through patch 258, slots 260 similar to slots 246 and 248 may be formed within the outer annular surface of roller 234.

Figure 31:
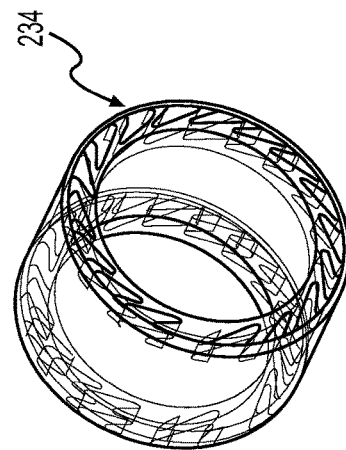

In an alternative embodiment shown in FIG. 31, the silicone of roller 234 may be left clear or at least partially transparent. In this embodiment, slots 260 may be omitted.

In one embodiment, indexing features 250 of insert 232 discussed above may interlock with flexures 256, such that slots 246, 248 and 260 align with each other. For example, an indexing feature 250 may pass between each pairing of adjacent flexures 256 (e.g., within gap 254).

To prevent the materials being compacted from sticking to roller 234 and/or being disrupted by slots 260, roller 234 may be wrapped with cover 236. Cover 236 may be at least partially transparent (e.g., about 70-99% transparent) to the energy (e.g., to light energy having a 350-450 nm wavelength, such as a wavelength of about 405 nm). Cover 236 may be fabricated from a low-friction material (e.g., Polytetrafluoroethylene—PTFE, Fluorinated ethylene propylene—FEP, etc.). In one example, FEP may be utilized for cover 236 due to its greater transparency when compared with PTFE.

Because cure energy may be directed through roller subassembly 222 to the matrix-wetted reinforcement, curing at (e.g., just before, directly over, and/or just after) the TCP may be possible. It is contemplated that enough curing may take place to tack the reinforcement before little, if any, movement of the reinforcement away from the TCP location has occurred. This may improve placement accuracy of the reinforcement. It is also contemplated that the matrix may be cured only at an outer surface (e.g., enough to tack and/or maintain a desired shape) or that the matrix may be through-cured via exposure to only the energy from sources 226 (in addition to or without any extraneous environmental exposure). In some applications, however, additional energy exposure (e.g., oven baking, autoclave heating, etc.) after completion of structure 12 may be required.

Figure 33:
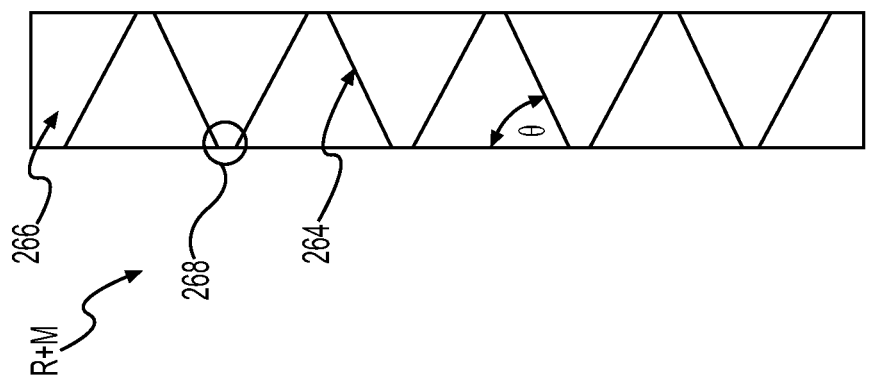
Figure 32:
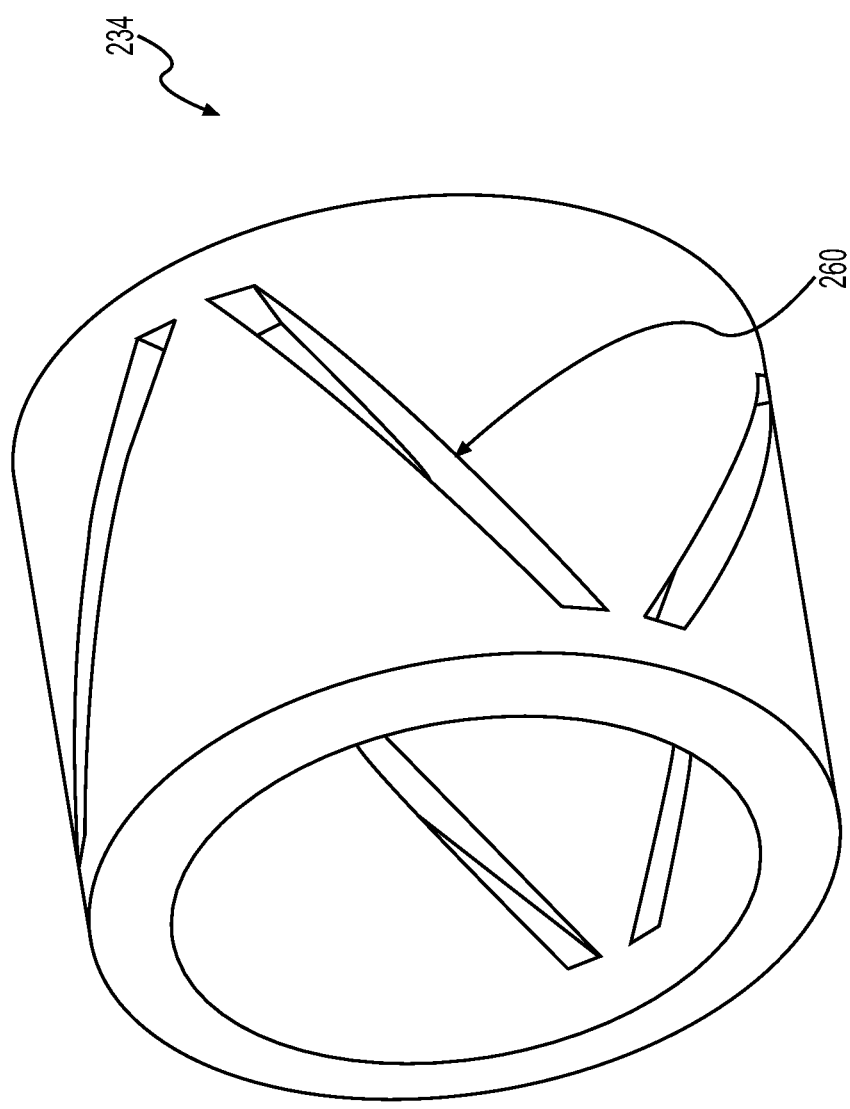
Figure 34:
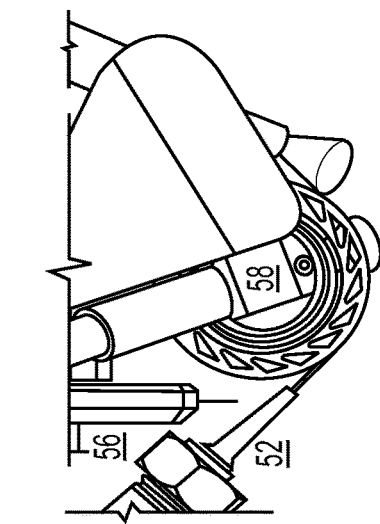
FIGS. 34, 35, 36, 37 and 38 are diagrammatic illustrations showing operation of the feeding, cutting, compacting and curing portions of FIGS. 19 and 20.
Figure 35:
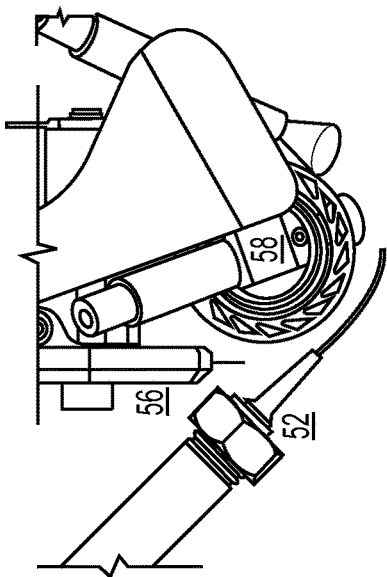
Figure 36:
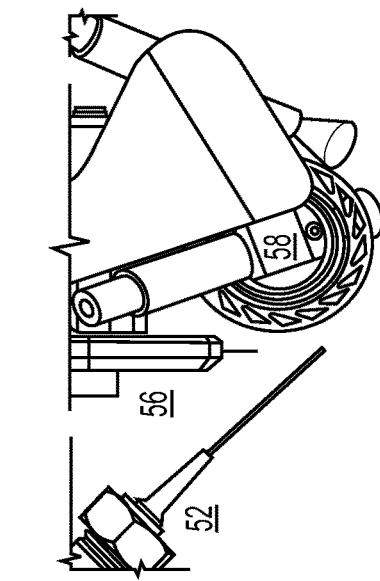

FIG. 32 illustrates an alternative embodiment of roller 234. As shown in this embodiment, slots 260 may be spaced further apart and oriented obliquely relative to axial and radial directions of roller 234. It has been found that, in some applications, greater interlaminar shear strength may be achieved when adjacent tracks of material are discharged and compressed together while still at least partially wet. For example, when matrix at sides of the adjacent tracks are left at least partially (e.g., substantially) uncured before compression and thereafter cured together at the same time, a greater interlaminar shear strength may be achieved. In these applications, the exemplary roller 234 of FIG. 32 may allow enough cure energy from sources 262 to reach the compacting material to hold the material in place, while still leaving some (e.g., most) of the material uncured. FIG. 33 illustrates material that has been compacted by roller 234, the material having sections 264 that are at least partially cured (e.g., by leading sources 262) and sections 266 that are cured to a lesser degree or that are completely uncured.

As can be seen in FIG. 32, sections 264 may make up a minor portion (e.g., less than 10%) of the discharged material. In addition, transverse edges of the material may only be cured at points 268 that are spaced apart from each other in the length or axial direction of the discharged reinforcements. An angle θ of slots 260 and the corresponding sections 264 relative to the length or axial direction of the discharged reinforcements may be selected to provide a desired spacing between points 268 and/or a desired ratio of sections 264 to sections 266. In the disclosed embodiment, the angle θ may be about 30-60° (e.g., about 45°).

As shown in FIGS. 34, 35, 36, 37 and 38, modules 52, 56 and 58 may be selectively moved (e.g., at a constant rate or a variable rate related to material characteristics) to any position between extended and retracted end positions. For example, module 52 (along with module 50—referring to FIG. 2) may be moved between a retracted position shown in FIGS. 37 and 38 that is farthest from module 58 and an extended position shown in FIG. 36 that is closest to module 58. Likewise, module 56 may be moved between a retracted position shown in FIGS. 34-37 that is farthest from the reinforcement discharging from module 52 and an extended position shown in FIG. 38 that is closest to the reinforcement. Finally, module 58 may be moved between a retracted position shown in FIGS. 34 and 35 and an extended position shown in FIGS. 36-38. In addition, module 58 may selectively be biased within a zone (e.g., within about +/−10 mm) about the extended position during engagement with the discharging material based on a pressure of module 58 against the material. It should be noted that movement (i.e., extension and retraction) of module 58 may result in similar simultaneous motion of module 56, but that module 56 may additionally move (i.e., extend and retract) relative to module 58.

The extensions and retractions of modules 52, 56 and 58 may be coordinated in different ways during various operations of head 16. For example, all of modules 52, 56 and 58 may initially be in their respective retracted positions (see FIG. 34) at a start of a threading event (e.g., just after completion of a severing event). Thereafter, module 52 (i.e., with module 50 clamped against the reinforcement) may be extended to push reinforcement protruding therefrom to a location under module 58 (see FIG. 35). Module 58 may then be extended to contact the protruding reinforcement (see FIG. 36) and press the reinforcement against an underlying layer (not shown). Modules 52, 56 and 58 may remain in these positions throughout discharging of the reinforcement.

Figure 37:
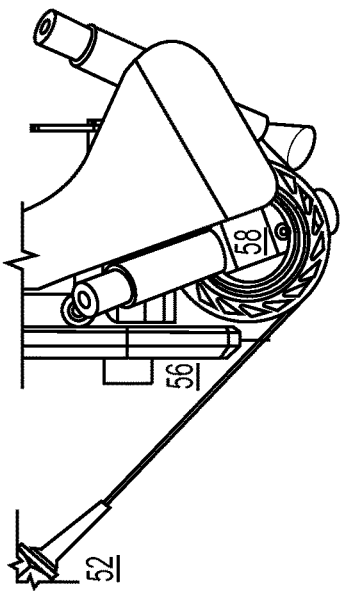
Figure 38:
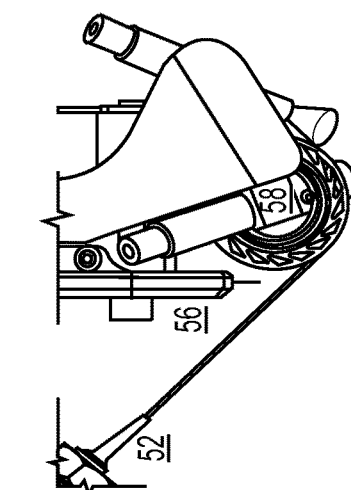

After discharging has terminated, module 52 may be retracted away from module 58 to provide clearance for module 56 (see FIG. 37). Module 56 may then be extended to sever the reinforcement (see FIG. 38), and the cycle may restart at FIG. 34.

It should be noted that, when modules 52 and 58 are in their extended positions, the reinforcement may be directed along the axis of module 52 toward module 58 at a nominal tangent to roller 234. This may cause the reinforcement to be directed against roller 234 at times (e.g., when roller 234 is biased 0 to +10 mm from the neutral position within its allowed zone).

Distances between the extended positions of modules 52, 56 and 58 may establish a minimum length of reinforcement that can be discharged compacted and severed. For example, this minimum length may be equal to a distance from mechanism 210 of module 56 to the nip point of module 58 along the axis of module 52 (e.g., along the trajectory of the reinforcement). In one embodiment, the minimum length may be about equal to 0.7-0.8 (e.g., about 0.78) times a diameter of roller 234, when an orthogonal offset distance between mechanism 210 and an axis or roller 234 is about 0.5-0.6 (e.g., about 0.63) times the diameter or roller 234. In other words, the minimum length may be about equal to 1.17-1.6 (e.g., about 1.24) times the orthogonal distance. The distance between the extended and retracted positions of module 52 (a.k.a., the feed distance) may be greater than the minimum length (e.g., about 2× the minimum length). The distance between the extended and retracted positions of module 56 may be less than the minimum length (e.g., about 0.25× the minimum length). In one example, module 52 may actually extend past module 56 toward module 58—this may reduce the feed distance to be less than the minimum length.

INDUSTRIAL APPLICABILITY

The disclosed system and print head may be used to manufacture composite structures having any desired cross-sectional size, shape, length, density, and/or strength. The composite structures may include any number of different reinforcements of the same or different types, diameters, shapes, configurations, and consists, each coated with a common matrix. Operation of system 10 will now be described in detail with reference to FIGS. 1-38.

At a start of a manufacturing event, information regarding a desired structure 12 may be loaded into system 10 (e.g., into controller 20 that is responsible for regulating operations of support 14 and/or head 16). This information may include, among other things, a size (e.g., diameter, wall thickness, length, etc.), a shape, a contour (e.g., a trajectory), surface features (e.g., ridge size, location, thickness, length; flange size, location, thickness, length; etc.) and finishes, connection geometry (e.g., locations and sizes of couplers, tees, splices, etc.), location-specific matrix stipulations, location-specific reinforcement stipulations, compaction requirements, curing requirements, etc. It should be noted that this information may alternatively or additionally be loaded into system 10 at different times and/or continuously during the manufacturing event, if desired.

Based on the component information, one or more different reinforcements and/or matrixes may be selectively loaded into head 16. For example, one or more supplies of reinforcement may be loaded onto creel 19 (referring to FIGS. 1-5) of module 44, and one or more cartridges 110 of matrix may be placed into vessel 112 of module 46.

The reinforcements may then be threaded through head 16 prior to start of the manufacturing event. Threading may include passing the reinforcement from module 44 through guide 80, around redirects 102 of module 48, and then between rollers 146 and 152 of module 50. The reinforcement may then pass through module 52 and be wetted with matrix. Module 52 may then move to its extended position to place the wetted reinforcement under module 58. Module 58 may then be extended to press the wetted reinforcement against an underlying layer. After threading is complete, head 16 may be ready to discharge matrix-coated reinforcements.

At a start of a discharging event, cure sources 226 may be activated, module 50 may be deactivated to release the reinforcement, and head 16 may be moved away from a point of anchor to cause the reinforcement to be pulled out of head 16 and at least partially cured. This discharge may continue until discharge is complete and/or until head 16 must move to another location of discharge without discharging material during the move.

As head 16 nears an end of a discharge path, head 16 may be controlled to stop short of a terminal point by a distance equal to the minimum length discussed above. At this location, motion of head 16 may stop, and sources 226 may be deactivated. Module 52 may be moved to its retracted position, module 50 may be activated to clamp the reinforcement, and module 56 may be activated and extended to sever the reinforcement. Module 56 may then be deactivated and retracted. Sources 226 may be reactivated, and head 16 may be moved to complete the discharge path. Head 16 may then be moved to a start location of a next discharge path, during which time module 58 may be retracted.

In some embodiments, a pressure applied by module 58 on the discharged material may vary during different events. For example, during a severing event, when module 58 may exert pressure against the material at a single location for an extended period of time, a pressure of module 58 may be reduced. This may help to avoid denting structure 12 at the severing location.

During discharge of the wetted reinforcements from head 16, module 58 may roll over the reinforcements. A pressure applied by cover 236 may press the reinforcements against an adjacent (e.g., underlying) layer of structure 12, thereby compacting the material. Sources 226 may remain active during material discharge from head 16 and during compacting, such that at least a portion of the material is cured and hardened enough to remain tacked to the underlying layer and/or to maintain its discharged shape and location. In some embodiments, a majority (e.g., all) of the matrix may be cured by exposure to energy from source 226. It is contemplated, however, that the sources 226 associated with roller subassembly 222 may only be active during tacking and anchoring, and thereafter most (e.g., all) of the curing performed only by the trailing sources 226.

It should be noted that the amount of cure energy generated by module 58 may be variable. For example, the energy could be generated at levels that are related to other parameters (e.g., travel speed) of head 16. For instance, as the travel speed of head 16 increases and the discharge rate of reinforcement from head 16 proportionally increases, the amount of energy generated by module 58 and directed toward the discharging material may likewise increase. This may allow a consistent unit of energy to be received by the matrix coating the reinforcement under a range of conditions. It is also possible that a greater unit of energy may be received during particular conditions (e.g., during anchoring, during free-space printing, at particular geometric locations of structure 12, etc.), if desired. Each of sources 226 may be independently activated, activated in pairs (e.g., leading or trailing sources), or activated simultaneously in a cooperative manner.

The component information may be used to control operation of system 10. For example, the reinforcements may be discharged from head 16 (along with the matrix), while support 14 selectively moves head 16 in a desired manner during curing, such that an axis of the resulting structure 12 follows a desired trajectory (e.g., a free-space, unsupported, 3-D trajectory). In addition, module 46 may be carefully regulated by controller 20 such that the reinforcement is wetted with a precise and desired amount of the matrix. For example, based on signals generated by sensor 198 that are indicative of a feed rate of the reinforcement through head 16, controller 20 may selectively increase or decrease a speed of module 46 to provide a corresponding feed rate of matrix to module 52. In this way, regardless of the travel speed of head 16, a desired ratio of matrix-to-reinforcement may always be maintained.

As discussed above, during payout of matrix-wetted reinforcement from head 16, modules 44 and 48 may together function to maintain a desired level of tension within the reinforcement. It should be noted that the level of tension could be variable, in some applications. For example, the tension level could be lower during anchoring and/or shortly thereafter to inhibit pulling of the reinforcement during a time when adhesion may be lower. The tension level could be reduced in preparation for severing and/or during a time between material discharge. Higher levels of tension may be desirable during free-space printing to increase stability (e.g., to reduce sagging) in the discharged material. Other reasons for varying the tension levels are also contemplated. The level of tension may be adjusted via threshold adjustments associated with when actuator 74 is turned on/off and/or what speeds and/or torques are applied by actuator 74 in response to signals from sensor 104.

It will be apparent to those skilled in the art that various modifications and variations can be made to the disclosed system and head. Other embodiments will be apparent to those skilled in the art from consideration of the specification and practice of the disclosed system and head. For example, while module 48 has been disclosed as capable of generating signals indicative of tension within the reinforcement that are then used to adjust creel operation (e.g., payout), it is contemplated that the signals may instead be indicative of a position of module 48 at a desired constant tension level. In this example, creel 19 may be controlled to maintain a buffer about the position of module 48, such that creel 19 may be kept at a near steady state regardless of the motion of module 48 and payout of the reinforcement. It is intended that the specification and examples be considered as exemplary only, with a true scope being indicated by the following claims and their equivalents.

What is claimed is:

1. An additive manufacturing system, comprising:
   a support;
   a print head operatively connected to and moveable by the support, the print head including:
   a first supply configured to hold a continuous reinforcement;
   a second supply configured to hold a matrix separate from the continuous reinforcement; and
   a wetting mechanism in separate communication with the first and second supplies and configured to discharge the continuous reinforcement wetted with the matrix; and
   a controller programmed to selectively pressurize the second supply to direct the matrix to the wetting mechanism, wherein:
   the second supply is configured to receive a cartridge containing the matrix;
   the cartridge includes a piston moved by the controller to push matrix out of the second supply; and
   the controller is programmed to selectively communicate a pressurized medium with the piston to selectively pressurize the second supply.

2. The additive manufacturing system of claim 1, wherein wetting mechanism is located remotely from the second supply and communicated with the second supply via a conduit.

3. The additive manufacturing system of claim 1, further including a sensor associated with the wetting mechanism, wherein the controller is programmed to pressurize the second supply based on a signal from the sensor in a feedback manner.

4. The additive manufacturing system of claim 3, wherein the sensor is a pressure sensor configured to generate the signal in response to a pressure inside the wetting mechanism.

5. The additive manufacturing system of claim 4, wherein the controller is programmed to pressurize the second supply based further on a feed rate of the continuous reinforcement through the wetting mechanism in a feedforward manner.

6. The additive manufacturing system of claim 1, further including a heating element configured to heat the matrix in at least one of the second supply and the wetting mechanism.

7. The additive manufacturing system of claim 1, wherein the second supply includes:
   a vessel having an open end configured to receive the cartridge; and
   a cap configured to close off the open end of the vessel.

8. The additive manufacturing system of claim 7, further including a bracket connecting the vessel to a housing of the print head.

9. The additive manufacturing system of claim 1, further including a metering valve disposed between the second supply and the wetting mechanism.

10. An additive manufacturing system, comprising:
    a support; and
    a print head operatively connected to and moveable by the support, the print head including:
    a first supply configured to hold a continuous reinforcement;
    a second supply configured to hold a matrix separate from the continuous reinforcement;
    a wetting mechanism located remotely from and in communication with the first and second supplies, the wetting mechanism configured to discharge the continuous reinforcement wetted with the matrix a first sensor associated with the wetting mechanism and configured to generate a first signal associated with a pressure of the matrix in the wetting mechanism; and
    a second sensor associated with the second supply and configured to generate a second signal indicative of an amount of matrix remaining in the second supply.

11. The additive manufacturing system of claim 10, further including a heating element configured to heat the matrix in the wetting mechanism.

12. The additive manufacturing system of claim 11, further including a pneumatic actuator configured to push matrix from the second supply to the wetting mechanism.

13. The additive manufacturing system of claim 10, wherein the second sensor is an optical sensor.

14. The additive manufacturing system of claim 10, wherein the second supply includes a flexible membrane that collapses as matrix is pushed from the second supply.

15. The additive manufacturing system of claim 14, wherein the flexible membrane is configured to block energy that triggers curing of the matrix.

16. The additive manufacturing system of claim 14, wherein the flexible membrane is at least partially transparent.

17. The additive manufacturing system of claim 10, wherein the second supply is configured to receive a cartridge containing the matrix.

18. The additive manufacturing system of claim 17, wherein the cartridge includes a piston configured to push matrix out of the second supply.

19. The additive manufacturing system of claim 18, wherein the controller is programmed to selectively communicate a pressurized medium with the piston to selectively pressurize the second supply.

20. An additive manufacturing system, comprising:
a support;
a print head operatively connected to and moveable by the support, the print head including:
 a first supply configured to hold a continuous reinforcement;
 a second supply configured to hold a matrix separate from the continuous reinforcement; and
 a wetting mechanism in separate communication with the first and second supplies and configured to discharge the continuous reinforcement wetted with the matrix;
a controller programmed to selectively pressurize the second supply to direct the matrix to the wetting mechanism, wherein:
 the second supply is configured to receive a cartridge containing the matrix;
 the cartridge includes a piston configured to push matrix out of the second supply; and
a sensor configured to detect a position of the piston and direct a corresponding signal indicative of an amount of matrix remaining in the cartridge to the controller.

* * * * *